United States Patent
Adams et al.

(10) Patent No.: US 9,981,193 B2
(45) Date of Patent: *May 29, 2018

(54) MOVEMENT BASED RECOGNITION AND EVALUATION

(75) Inventors: Isaac Adams, Revere, MA (US); Matthew C. Boch, Somerville, MA (US); Marc A. Flury, Rosemount, MN (US)

(73) Assignee: HARMONIX MUSIC SYSTEMS, INC., Boston, MA (US)

(*) Notice: Subject to any disclaimer, the term of this patent is extended or adjusted under 35 U.S.C. 154(b) by 863 days.

This patent is subject to a terminal disclaimer.

(21) Appl. No.: 13/288,916

(22) Filed: Nov. 3, 2011

(65) Prior Publication Data

US 2012/0143358 A1    Jun. 7, 2012

Related U.S. Application Data

(63) Continuation-in-part of application No. 12/913,493, filed on Oct. 27, 2010, and a continuation-in-part of
(Continued)

(51) Int. Cl.
*G06F 3/048* (2013.01)
*A63F 13/814* (2014.01)
(Continued)

(52) U.S. Cl.
CPC .......... *A63F 13/814* (2014.09); *A63F 13/213* (2014.09); *A63F 13/5375* (2014.09);
(Continued)

(58) Field of Classification Search
CPC ...... A63F 2009/2435; A63F 2009/2447; A63F 13/213; A63F 2300/1087
(Continued)

(56) References Cited

U.S. PATENT DOCUMENTS

D211,666 S    7/1968    MacGillavry
3,430,530 A    3/1969    Grindinger
(Continued)

FOREIGN PATENT DOCUMENTS

AT    468071 T    6/2010
AU    741239 B2    4/1999
(Continued)

OTHER PUBLICATIONS

U.S. Appl. No. 12/913,493, filed Oct. 27, 2010 (69 pages).
(Continued)

*Primary Examiner* — Patrick F Riegler
(74) *Attorney, Agent, or Firm* — Wilmer Cutler Pickering Hale and Dorr LLP

(57) ABSTRACT

This disclosure relates generally to analysis of movement that is electronically captured and recognition of which movement was performed for purposes of evaluation. This type of motion capture, analysis and evaluation can have applicability across a number of fields, such as healthcare, entertainment, communication, and manufacturing. The recognition can occur once movement information collected from sensors is inputted into the system. The system can then analyze the movement information to determine what the movement is. In some games, such as sports games, movement recognition can provide feedback to a user about what they are doing. In other games, such as dance games, movement recognition can allow for users to dance a move from a set of moves providing for a more entertaining game.

24 Claims, 10 Drawing Sheets

Related U.S. Application Data application No. 12/940,794, filed on Nov. 5, 2010, now Pat. No. 8,702,485.

(60) Provisional application No. 61/255,462, filed on Oct. 27, 2009, provisional application No. 61/354,073, filed on Jun. 11, 2010.

(51) Int. Cl.
| | |
|---|---|
| *A63F 13/5375* | (2014.01) |
| *A63F 13/213* | (2014.01) |
| *G06F 3/01* | (2006.01) |
| *G06F 3/0481* | (2013.01) |
| *G06F 3/0482* | (2013.01) |
| *G06K 9/00* | (2006.01) |
| *A63F 13/54* | (2014.01) |
| *A63F 13/46* | (2014.01) |

(52) U.S. Cl.
CPC .............. *G06F 3/011* (2013.01); *G06F 3/017* (2013.01); *G06F 3/0482* (2013.01); *G06F 3/04815* (2013.01); *G06K 9/00342* (2013.01); *A63F 13/46* (2014.09); *A63F 13/54* (2014.09); *A63F 2300/1087* (2013.01); *A63F 2300/305* (2013.01); *A63F 2300/6045* (2013.01); *A63F 2300/61* (2013.01); *A63F 2300/638* (2013.01); *A63F 2300/8047* (2013.01)

(58) Field of Classification Search
USPC ......................................................... 715/764
See application file for complete search history.

(56) References Cited

U.S. PATENT DOCUMENTS

| | | |
|---|---|---|
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,443 A | 4/1992 | Smith et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,471,576 A | 11/1995 | Yee |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Fakespace |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,588,096 A | 12/1996 | Sato et al. |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,689,618 A | 11/1997 | Gasper et al. |
| 5,693,903 A | 12/1997 | Heidorn et al. |
| 5,701,511 A | 12/1997 | Smith |
| D389,216 S | 1/1998 | Isetani et al. |
| 5,704,836 A | 1/1998 | Norton et al. |
| 5,711,715 A | 1/1998 | Ringo et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,772,512 A | 6/1998 | Chichester |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,832,229 A | 11/1998 | Tomoda et al. |
| 5,833,469 A | 11/1998 | Ito et al. |
| 5,838,909 A | 11/1998 | Roy et al. |
| D403,024 S | 12/1998 | Muraki et al. |
| 5,861,881 A | 1/1999 | Freeman et al. |
| 5,874,686 A | 2/1999 | Ghias et al. |
| 5,879,236 A | 3/1999 | Lambright |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |

(56) References Cited

U.S. PATENT DOCUMENTS

| | | |
|---|---|---|
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,077,162 A | 6/2000 | Weiss |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,126,548 A | 10/2000 | Jacobs et al. |
| 6,137,487 A | 10/2000 | Mantha |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,191,773 B1 | 2/2001 | Maruno et al. |
| 6,206,782 B1 | 3/2001 | Walker et al. |
| 6,215,411 B1 | 4/2001 | Gothard |
| 6,219,045 B1 | 4/2001 | Leahy et al. |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,267,674 B1 | 7/2001 | Kondo et al. |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,345,111 B1 | 2/2002 | Yamaguchi et al. |
| 6,347,994 B1 | 2/2002 | Yoshikawa et al. |
| 6,347,998 B1 | 2/2002 | Yoshitomi et al. |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,581 B1 | 8/2002 | Neuhauser et al. |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,597,861 B1 | 7/2003 | Tozaki et al. |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,625,388 B2 | 9/2003 | Winter et al. |
| 6,629,892 B2 | 10/2003 | Oe et al. |
| 6,634,886 B2 | 10/2003 | Oyama et al. |
| 6,636,238 B1 | 10/2003 | Amir et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,654,863 B2 | 11/2003 | Nishio |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,697,079 B2 | 2/2004 | Rose |
| 6,710,785 B1 | 3/2004 | Asai et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |

(56) References Cited

U.S. PATENT DOCUMENTS

| | | |
|---|---|---|
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,788,880 B1 | 9/2004 | Fuchigami et al. |
| 6,801,930 B1 | 10/2004 | Dionne et al. |
| 6,802,019 B1 | 10/2004 | Lauder |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,860,810 B2 | 3/2005 | Cannon et al. |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,909,420 B1 | 6/2005 | Nicolas et al. |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,008,323 B1 | 3/2006 | Hayashi |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,047,503 B1 | 5/2006 | Parrish et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,181,636 B2 | 2/2007 | Kim et al. |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,386,782 B2 | 6/2008 | Comps et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,530,030 B2 | 5/2009 | Baudisch |
| 7,536,654 B2 | 5/2009 | Anthony et al. |
| 7,538,776 B2 | 5/2009 | Edwards et al. |
| 7,546,130 B2 | 6/2009 | Vance |
| 7,559,834 B1 | 7/2009 | York |

(56) References Cited

U.S. PATENT DOCUMENTS

| | | |
|---|---|---|
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,587,680 B2 | 9/2009 | Wada |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,614,011 B2 | 11/2009 | Karidis et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,806,764 B2 | 10/2010 | Brosnan et al. |
| 7,814,436 B2 | 10/2010 | Schrag et al. |
| 7,818,689 B2 | 10/2010 | Wada |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| D640,711 S | 6/2011 | Ng et al. |
| D642,192 S | 7/2011 | Arnold |
| 7,973,230 B2 | 7/2011 | Mahowald |
| 7,979,574 B2 | 7/2011 | Gillo et al. |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,009,022 B2 | 8/2011 | Kipman et al. |
| 8,010,088 B2 | 8/2011 | Cheng |
| 8,026,435 B2 | 9/2011 | Stoddard et al. |
| 8,057,290 B2 | 11/2011 | Vance et al. |
| 8,068,605 B2 | 11/2011 | Holmberg |
| D650,802 S | 12/2011 | Jang et al. |
| 8,074,184 B2 | 12/2011 | Garside et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,122,375 B2 | 2/2012 | Ito |
| D658,195 S | 4/2012 | Cranfill |
| D658,196 S | 4/2012 | Wood et al. |
| D660,861 S | 5/2012 | Lee et al. |
| 8,176,438 B2 | 5/2012 | Zaman et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 8,255,831 B2 | 8/2012 | Araumi |
| 8,261,209 B2 | 9/2012 | Goto et al. |
| 8,444,464 B2 | 5/2013 | Boch et al. |
| 8,449,360 B2 | 5/2013 | Stoddard et al. |
| 8,493,354 B1 | 7/2013 | Birnbaum et al. |
| 8,702,485 B2 | 4/2014 | Flury et al. |
| 8,744,121 B2 | 6/2014 | Polzin et al. |
| 8,745,541 B2 | 6/2014 | Wilson et al. |
| 8,749,557 B2 | 6/2014 | Evertt et al. |
| 9,358,456 B1 | 6/2016 | Challinor et al. |
| 9,383,814 B1 | 7/2016 | Capper et al. |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0034014 A1* | 10/2001 | Nishimoto et al. ........... 434/247 |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1* | 2/2002 | Kim et al. ...................... 463/36 |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |

(56) References Cited

U.S. PATENT DOCUMENTS

| | | |
|---|---|---|
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160823 A1* | 10/2002 | Watabe ................ A63F 13/10 463/7 |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0063115 A1* | 4/2003 | Kaku ................ G06F 3/0421 715/711 |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0185041 A1 | 10/2003 | Takahashi et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0005924 A1 | 1/2004 | Watabe et al. |
| 2004/0012540 A1 | 1/2004 | Treibitz et al. |
| 2004/0021684 A1 | 2/2004 | Millner |
| 2004/0043815 A1 | 3/2004 | Kaminkow |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127285 A1 | 7/2004 | Kavana |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0147300 A1 | 7/2004 | Seelig et al. |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0184473 A1 | 9/2004 | Tavli et al. |
| 2004/0186720 A1 | 9/2004 | Kemmochi |
| 2004/0193413 A1 | 9/2004 | Wilson et al. |
| 2004/0204211 A1 | 10/2004 | Suzuki |
| 2004/0204238 A1 | 10/2004 | Aoki |
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1 | 11/2004 | Smith et al. |
| 2004/0236543 A1 | 11/2004 | Stephens |
| 2004/0239678 A1 | 12/2004 | Tsunashima et al. |
| 2004/0240855 A1 | 12/2004 | Kagle |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0014554 A1 | 1/2005 | Walker et al. |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0054440 A1 | 3/2005 | Anderson et al. |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0108657 A1 | 5/2005 | Han |
| 2005/0115383 A1 | 6/2005 | Chang |
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0159209 A1 | 7/2005 | Fiden et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0025282 A1* | 2/2006 | Redmann ............... A61B 5/103 482/8 |
| 2006/0026304 A1 | 2/2006 | Price |
| 2006/0030382 A1 | 2/2006 | Okamura et al. |
| 2006/0032085 A1 | 2/2006 | Randall |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |

(56) References Cited

U.S. PATENT DOCUMENTS

| | | |
|---|---|---|
| 2006/0166744 A1 | 7/2006 | Igarashi et al. |
| 2006/0175758 A1 | 8/2006 | Riolo |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0209019 A1 | 9/2006 | Hu |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252474 A1 | 11/2006 | Zalewski et al. |
| 2006/0252503 A1 | 11/2006 | Salter |
| 2006/0258450 A1 | 11/2006 | Ishihata et al. |
| 2006/0266200 A1* | 11/2006 | Goodwin ................ 84/611 |
| 2006/0287105 A1 | 12/2006 | Willis |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0010329 A1 | 1/2007 | Craig et al. |
| 2007/0015570 A1 | 1/2007 | Pryzby |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0060336 A1 | 3/2007 | Marks et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0126874 A1* | 6/2007 | Kake ..................... 348/159 |
| 2007/0139443 A1 | 6/2007 | Marks et al. |
| 2007/0140510 A1 | 6/2007 | Redmann |
| 2007/0155494 A1 | 7/2007 | Wells et al. |
| 2007/0162497 A1 | 7/2007 | Pauws |
| 2007/0162850 A1 | 7/2007 | Adler et al. |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0265098 A1 | 11/2007 | Shimada et al. |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0001950 A1 | 1/2008 | Lin et al. |
| 2008/0009346 A1 | 1/2008 | Jessop et al. |
| 2008/0009347 A1 | 1/2008 | Radek |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0100572 A1 | 5/2008 | Boillot |
| 2008/0101762 A1 | 5/2008 | Kellock et al. |
| 2008/0102958 A1 | 5/2008 | Kitamura et al. |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0132334 A1 | 6/2008 | Nonaka et al. |
| 2008/0141181 A1 | 6/2008 | Ishigaki |
| 2008/0143722 A1 | 6/2008 | Pagan |
| 2008/0146342 A1 | 6/2008 | Harvey et al. |
| 2008/0152191 A1 | 6/2008 | Fujimura et al. |
| 2008/0155421 A1 | 6/2008 | Ubillos et al. |
| 2008/0155474 A1 | 6/2008 | Duhig |
| 2008/0184870 A1 | 8/2008 | Toivola |
| 2008/0188305 A1 | 8/2008 | Yamazaki et al. |
| 2008/0191864 A1* | 8/2008 | Wolfson ................ 340/524 |
| 2008/0192736 A1 | 8/2008 | Jabri et al. |
| 2008/0194319 A1 | 8/2008 | Pryzby et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0231926 A1 | 9/2008 | Klug et al. |
| 2008/0234023 A1* | 9/2008 | Mullahkhel et al. ............ 463/7 |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0300053 A1 | 12/2008 | Muller |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0027337 A1 | 1/2009 | Hildreth |
| 2009/0038467 A1 | 2/2009 | Brennan |
| 2009/0069096 A1* | 3/2009 | Nishimoto ................. 463/43 |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0106667 A1 | 4/2009 | Lyle et al. |
| 2009/0122146 A1 | 5/2009 | Zalewski et al. |
| 2009/0135135 A1 | 5/2009 | Tsurumi |
| 2009/0149257 A1 | 6/2009 | Ferguson et al. |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0197665 A1 | 8/2009 | Christensen |
| 2009/0213123 A1 | 8/2009 | Crow |
| 2009/0215533 A1 | 8/2009 | Zalewski et al. |
| 2009/0217211 A1 | 8/2009 | Hildreth et al. |
| 2009/0222392 A1 | 9/2009 | Martin et al. |
| 2009/0222765 A1 | 9/2009 | Ekstrand |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0262118 A1 | 10/2009 | Arikan et al. |
| 2009/0265668 A1 | 10/2009 | Esser et al. |
| 2009/0278796 A1* | 11/2009 | Komazaki ................ 345/156 |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009746 A1 | 1/2010 | Raymond et al. |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035682 A1 | 2/2010 | Gentile et al. |
| 2010/0035688 A1 | 2/2010 | Picunko |
| 2010/0039378 A1 | 2/2010 | Yabe et al. |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |

(56) References Cited

U.S. PATENT DOCUMENTS

| | | |
|---|---|---|
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0118033 A1* | 5/2010 | Faria .............................. 345/473 |
| 2010/0120470 A1 | 5/2010 | Kim et al. |
| 2010/0137049 A1 | 6/2010 | Epstein |
| 2010/0138785 A1 | 6/2010 | Uoi |
| 2010/0144436 A1 | 6/2010 | Marks et al. |
| 2010/0151948 A1* | 6/2010 | Vance et al. ..................... 463/43 |
| 2010/0160038 A1 | 6/2010 | Youm et al. |
| 2010/0161432 A1 | 6/2010 | Kumanov et al. |
| 2010/0167823 A1 | 7/2010 | Winkler |
| 2010/0186579 A1 | 7/2010 | Schnitman |
| 2010/0192106 A1 | 7/2010 | Watanabe et al. |
| 2010/0199221 A1 | 8/2010 | Yeung |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0231523 A1 | 9/2010 | Chou |
| 2010/0238182 A1 | 9/2010 | Geisner et al. |
| 2010/0245241 A1 | 9/2010 | Kim et al. |
| 2010/0247081 A1 | 9/2010 | Victoria Pons et al. |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0278393 A1 | 11/2010 | Snook et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0302145 A1 | 12/2010 | Langridge et al. |
| 2010/0302155 A1 | 12/2010 | Sands |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304860 A1 | 12/2010 | Gault et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2010/0306713 A1 | 12/2010 | Geisner et al. |
| 2011/0010667 A1 | 1/2011 | Sakai et al. |
| 2011/0021273 A1* | 1/2011 | Buckley et al. ................ 463/31 |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0080336 A1 | 4/2011 | Leyvand et al. |
| 2011/0083106 A1 | 4/2011 | Hamagishi |
| 2011/0083112 A1 | 4/2011 | Matsubara et al. |
| 2011/0083122 A1 | 4/2011 | Chen et al. |
| 2011/0098106 A1 | 4/2011 | He et al. |
| 2011/0098109 A1* | 4/2011 | Leake et al. ..................... 463/30 |
| 2011/0105206 A1 | 5/2011 | Rowe |
| 2011/0111580 A1 | 5/2011 | Aoyama et al. |
| 2011/0111850 A1 | 5/2011 | Beerhorst et al. |
| 2011/0118621 A1 | 5/2011 | Chu |
| 2011/0140931 A1 | 6/2011 | Geurts et al. |
| 2011/0151974 A1* | 6/2011 | Deaguero ....................... 463/37 |
| 2011/0151975 A1 | 6/2011 | Mori |
| 2011/0159938 A1 | 6/2011 | Umeda |
| 2011/0169832 A1 | 7/2011 | Brown et al. |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0255803 A1 | 10/2011 | Togawa |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0291988 A1 | 12/2011 | Bamji et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052942 A1 | 3/2012 | Esaki et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |
| 2012/0157263 A1 | 6/2012 | Sivak et al. |
| 2012/0214587 A1 | 8/2012 | Segal |
| 2012/0309477 A1 | 12/2012 | Mayles et al. |
| 2013/0132837 A1 | 5/2013 | Mead et al. |
| 2013/0203492 A1 | 8/2013 | Yum |
| 2013/0257807 A1 | 10/2013 | Harris et al. |
| 2014/0208204 A1 | 7/2014 | Lacroix et al. |
| 2015/0141102 A1 | 5/2015 | Asami et al. |

FOREIGN PATENT DOCUMENTS

| | | |
|---|---|---|
| AU | 200194329 | 10/2001 |
| AU | 2003285918 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |

(56) References Cited

FOREIGN PATENT DOCUMENTS

| | | |
|---|---|---|
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 000181482-0005 | 9/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 000859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2330739 A | 4/1999 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| IT | IN01685CN201 | 1/2012 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 11328124 A | 11/1999 |
| JP | 3003851 U | 1/2000 |
| JP | 2000014931 | 1/2000 |
| JP | 2000037490 | 2/2000 |
| JP | 3017986 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 3066528 U | 7/2000 |
| JP | 2000218046 | 8/2000 |
| JP | 3088409 B2 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 A | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |

(56) References Cited

FOREIGN PATENT DOCUMENTS

| | | |
|---|---|---|
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 A | 8/2001 |
| JP | 2001232062 A | 8/2001 |
| JP | 2001-252470 | 9/2001 |
| JP | 3204652 B2 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 3727275 B2 | 12/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |

(56) References Cited

FOREIGN PATENT DOCUMENTS

| | | | |
|---|---|---|---|
| JP | 2008018287 A | 1/2008 | |
| JP | 2008168143 A | 7/2008 | |
| JP | 2009531153 A | 9/2009 | |
| JP | 2010509000 A | 3/2010 | |
| KR | 20010027533 A | 4/2001 | |
| KR | 20050047024 A | 5/2005 | |
| RU | 2010146213 A | 5/2012 | |
| SG | 173496 A1 | 9/2011 | |
| TW | 340049 | 3/2009 | |
| TW | 200951764 A | 12/2009 | |
| TW | 201006526 A | 2/2010 | |
| TW | 322023 | 3/2010 | |
| TW | 201116318 A | 5/2011 | |
| WO | WO-199717598 A1 | 5/1997 | |
| WO | WO-97/23845 A2 | 7/1997 | |
| WO | WO-9938588 A1 | 8/1999 | |
| WO | WO-01/63592 A2 | 8/2001 | |
| WO | WO-0163592 | 8/2001 | |
| WO | WO-2002030535 A1 | 4/2002 | |
| WO | WO-200402590 A1 | 1/2004 | |
| WO | WO-200402594 A1 | 1/2004 | |
| WO | WO-200424256 A1 | 3/2004 | |
| WO | WO-200424263 A1 | 3/2004 | |
| WO | WO-200427631 A1 | 4/2004 | |
| WO | WO-200430779 A1 | 4/2004 | |
| WO | WO-2004039055 A2 | 5/2004 | |
| WO | WO-200453800 A1 | 6/2004 | |
| WO | WO-2004052483 A1 | 6/2004 | |
| WO | WO-200482786 A1 | 9/2004 | |
| WO | WO-200487272 A1 | 10/2004 | |
| WO | WO-2004101093 A1 | 11/2004 | |
| WO | WO-2004107270 A1 | 12/2004 | |
| WO | WO-200527062 A1 | 3/2005 | |
| WO | WO-200527063 A1 | 3/2005 | |
| WO | WO-200530354 A1 | 4/2005 | |
| WO | WO-2005039212 A1 | 4/2005 | |
| WO | WO-200599842 A1 | 10/2005 | |
| WO | WO-2005107902 A1 | 11/2005 | |
| WO | WO-2005/113096 A1 | 12/2005 | |
| WO | WO-2005114648 A1 | 12/2005 | |
| WO | WO-200606274 A1 | 1/2006 | |
| WO | WO-200675494 A1 | 7/2006 | |
| WO | WO-07/055522 A1 | 5/2007 | |
| WO | WO-2007070738 A2 | 6/2007 | |
| WO | WO-2007078639 | 7/2007 | |
| WO | WO-2007/115299 A2 | 10/2007 | |
| WO | WO-2007111247 A1 | 10/2007 | |
| WO | WO-2007130582 A2 | 11/2007 | |
| WO | WO-2008001088 A2 | 1/2008 | |
| WO | WO-2008145952 A1 | 12/2008 | |
| WO | WO-2009021124 A2 | 2/2009 | |
| WO | WO-2010018485 A1 | 2/2010 | |
| WO | WO-2010036989 A1 | 4/2010 | |
| WO | WO-2011067469 A1 | 6/2011 | |
| WO | WO-11155958 A1 | 12/2011 | |

OTHER PUBLICATIONS

U.S. Appl. No. 29/393,964, filed Jun. 10, 2011 (2 pages).
U.S. Appl. No. 29/393,967, filed Jun. 10, 2011 (2 pages).
U.S. Appl. No. 29/393,968, filed Jun. 10, 2011 (2 pages).
U.S. Appl. No. 29/393,970, filed Jun. 10, 2011 (2 pages).
U.S. Appl. No. 29/393,973, filed Jun. 10, 2011 (2 pages).
U.S. Appl. No. 29/393,975, filed Jun. 10, 2011 (2 pages).
[Video] "E3 2010 Live Demo", where Ubi talked about MJ:TE for Kinect (<http://www.gametrailers.com/video/e3-2010-michael-jackson/101449>).
[Video] MJ the Experience Kinect: release Apr. 2011, http://www.youtube.com/watch?v=N7oyxHIP48A.
[Video] 'Don't Stop'Gameplay Trailer: <http://www.gametrailers.com/video/dont-stop-michael-jackson/707336> (Nov. 10, 2010).
[Video] 'Ghosts' Gameplay Trailer: <http://www.gametrailers.com/video/ghosts-gameplay-michael-jackson/706825> Oct. 27, 2010.
[Video] Dance Summit 2001: Bust A Groove (Released Nov. 2, 2000 for PS2); <http://www.youtube.com/watch?v=E8NjTGHYQcM>.
[Video] Dancing With the Stars—Activision, Zoe Mode; <http://www.youtube.com/watch?v=C7zBVfEj0gg> (Oct. 2007).
[Video] Dancing with the Stars: We Dance—Activision, Zoe Mode; <http://www.youtube.com/watch?v=3IG0b-CT8vs> (Oct. 2008).
[Video] DDR Hottest Party; <http://www.youtube.com/watch?v=zk20hEzGmUY> (Sep. 2007).
[Video] E3 2010 Live Demo <http://www.gametrailers.com/video/e3-2010-michael-jackson/101449>; (Jun. 14, 2010).
[Video] Eyetoy Groove for PS2; <http://www.youtube.com/watch?v=c80aaOU_fuE>. Apr. 2004.
[Video] Gamescom'10—Billie Jean Demo <http://www.gametrailers.com/video/gc-10-michael-jackson/703294> (:58-1:13) (Aug. 20, 2010).
[Video] Gamescom '10—Working Day and Night Demo <http://www.gametrailers.com/video/gc-10-michael-jackson/7033295> (Aug. 20, 2010).
[Video] Grease Dance—505 Games: release—Oct. 2011. http://www.youtube.com/watch?v=PaGBHSB2urg.
[Video] Hannah Montana: Spotlight World Tour (Released Nov. 6, 2007 for Wii); <http://www.youtube.com/watch?v=WtyuU2NaL3Q>.
[Video] Britney's Dance Beat (Released May 8, 2002 for PS2); <http://www.youtube.com/watch?v=-KR1dRGNX_w>.
[Video] Dance Dance Revolution: Hottest Party 3 (Released Sep. 27, 2009 for Wii) <http://www.youtube.com/watch?v=zk20hEzGmUY>.
[Video] Dance on Broadway—Ubisfot, Longtail Studios; <http://www.youtube.com/watch?v=eYaP-dT4z-M> (Jun. 6, 2010).
[Video] Dance on Broadway: Jun. 2010 (http://youtube/Wi9Y5HHcvtY).
[Video] Dancing with the Stars: Oct. 2007 (http://www.youtube.com/watch?v=8UChG2v5DI).
Amplitude for Playstation. Retrieved from the Internet: www.target.com/gp/detail.html/601-0682676-9911341?asin=B00008597M &AFID. Retrieved on Feb. 22, 2005. 1 page.
Amplitude Review by Ryan Davis. Retrieved from the Internet: www.gamespot.com/amplitude/reviews/amplitude-review-6023980.html. Retrieved on Jun. 11, 2012. 4 pages.
Amplitude. Retrieved from the Internet: www.gamesquestdirect.com/71171972582.html. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.html. Retrieved on Jun. 8, 2012. 6 pages.
Association of British Scrabble Players. "Rolling System" ABSP, http://www.absp.org.uk/results/ratings_details.html. Retrieved May 25, 2011 (4 pages).
Beat Planet Music (Import) Review by Christian Nutt. Retrieved from the Internet: www.gamespot.com/gamespot/stories/reviews/0,10867,2546762,00.HTML. Retrieved on Jun. 11, 2012. 3 pages.
Beatmania IIDX 9 Style. Retrieved from the Internet: www.play-asia.com/OS-13-71-8g-70-giu.html. Retrieved on Feb. 22, 2005. 2 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review. h?reviewid=294. Retrieved on Jun. 11, 2012. 1 page.
Beatmania IIDX 7 Style. Retrieved from the Internet: www.liksang.com/Info.php?category=27&products id=4061. Retrieved on Feb. 22, 2005. 1 page.
Beatnik Patent Sale Offering, Nov. 2008 (81 pp).
Bishop, Sam; Frequency: If you decide to pick up this game, you better give up on the idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).

(56) References Cited

OTHER PUBLICATIONS

Bust A Groove Review by Jeff Gerstmann. Retrieved from the Internet: www.gamespot.com/ps/puzzlelbusta groove/printable_2546923.html. Retrieved on Jun. 11, 2012. 9 pages.
Bust A Groove. Retrieved from the Internet: www.buyrightgames.com/product_information.asp?rc=frgl&number=PS-BUSTA2. Retrieved on Feb. 22, 2005. 1 page.
Bust A Groove. Retrieved from the Internet: www.estarland.com/com/playstation.cat.F.product.6257.html. Retrieved on Jun. 11, 2012. 2 pages.
Bust A Groove: 989 Studios Best Game of the Year is a Funky Dance Sim that's Got the Fever by Doug Peny. Retrieved from the Internet http://psx.ign.com/articles/152/152308pl.html. Retrieved on Jun. 8, 2012. 5 pages.
BVH File Specification, Character Studio, http://web.archive.org/web/20060321075406/http:/Icharacterstudio.net/bvhfile specification.htm, Mar. 21, 2006 (16 pages).
Dance Dance Revolution Review by Andy Chien. Retrieved from the Internet www.gaming-age. com/reviews /archive/old reviews/psx/ddr. Retrieved on Feb. 22, 2005. 3 pages.
Dance Dance Revolution Review by Ryan Davis. Retrieved from the Internet www.gamespot.com/ps/puzzle/dancedancerevolutionfprintable_2699724.html. Retrieved on Jun. 11, 2012. 9 pages.
Dance Dance Revolution, Konami via www.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebx/product/224 7 89.asp. Retrieved on Feb. 22, 2005. 2 pages.
Dancing with the Stars Game Manual (1 page). Date not available.
Dave H, et al. StepMania Tutorial. Nov. 3, 2004. <http://web.archive.org/web/200411031145/www.stepmania.com/stepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prIntable_ 6024297 .html. Retrieved on Jun. 11, 2012. 10 pages.
Def Jam Vendetta. Retrieved from the Internet www.ebgames.com/ebx/product/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://m.ign.com/articles/2003/03/31/def-jam-vendetta-4 Retrieved on Jun. 8, 2012. 6 pages.
Digital Play: Reloaded. Opening Reception. Museum of the Moving Image. Mar. 19, 2005. <http://web.archive.Org/web/20050319060247/ http://www.movingimage.us/site/screenings/contenV2005/digital_play_reloaded.ht ml>. 1 page.
Donkey Konga Review by Ryan Davis. Retrieved from the Internet: www.gamespot.com/gamecube/puzzle/ donkeykonga/printable_6108977.html. Retrieved on Jun. 11, 2012. 11 pages.
Donkey Konga. Retrieved from the Internet: www.ebgames.com/ebx/product/244024.asp. Retrieved on Jun. 11, 2012. 2 pages.
Donkey Konga: Could a Game Featuring Donkey Kong and Mini-Bongos ever Fail? Our Full Review by Juan Castro. Retrieved from the Internet: cube.ign.com/articles/550/550723pI.html. Retrieved on Jun. 8, 2012. 6 pages.
DrumMania w/ Drum Set. Retrieved from the Internet www.estarland.com/.com/product18126.html Retrieved on Jun. 11, 2012. 2 pages.
DrumMania (Import) Review by Jeff Gerstmann. Retrieved from the Internet: www.gamespot.com/ps2/actionf drummania/printable_2546356.html. Retrieved on Jun. 11, 2012. 9 pages.
DrumMania OST. Retrieved from the Internet www.lik-sang.corn/info/php?category=264& products id=4793. Retrieved on Feb. 22, 2005. 2 pages.
DrumMania Review by Wyrdwad. Retrieved from the Internet www.gamefaqs.com/ps2/1997168-drummania/reviews/review-56573. Retrieved on Jun. 11, 2012. 2 pages.
ESRB Game Ratings: Game Rating & Descriptor Guide' via www.esrb.org[online], Retrieved from the Internet: <http://www.esrb.org/ratings/ratings-guide.jsp>. Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: http://ps2.ign.corn/articles/507/507854pl.html. Retrieved on Jun. 8, 2012. 8 pages.
Eye Toy: Groove Review by Ryan Davis. Retrieved from the Internet: www.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producL.gsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet www.gamespot.comrri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estarland.com/playstation2.cat.product.676.html. Retrieved on Jun. 14, 2012. 2 pages.
Gitaroo-Man Review by David Smith. Retrieved from the Internet http://p2.ign.com/articles/135/135184p1.html; retrieved Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet www.buyritegames.com/productinformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_information.asp?rc=frgl&number=PSJ-GUilWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=guitaryhero &oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report issued for PCT/US2010/054300, dated May 31, 2011 (5 pages).

(56) References Cited

OTHER PUBLICATIONS

International Search Report, PCT/US2006/062287, dated May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable . . . 608170 Retrieved on Jun. 14, 2012. 10 pages.
Karaoke Revolution. Retrieved from the Internet: www.ebgames.com/ebx/product/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS &PoleAssetID=MCJ04316180000&Querty=Icons&CTT=6 &Origin=EC01017435m (Feb. 21, 2007) (1 page).
Microsoft PowerPoint Handbook, (1 page) (1992).
Mojib Ribbon Playtest by Anoop Gantayat. Retrieved from the Internet: http://ie.ign.com/articles/442/442204p1.html. Retrieved on Jun. 8, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comIInfo.php?category=27&productsid=3805 &PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Non-Final Office Action as issued by the United States Patent and Trademark Office for U.S. Appl. No. 12/474,899, dated Jan. 19, 2011, 7 pages.
PaRappa the Rapper 2. Retrieved from the Internet: www.amazon.com/exec/obidos/tg/deteil/-/B00005UNWD/104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: www.estarland.com/index.asp?page=Playstation&cat=F&product=6871&q. Retrieved on Jun. 11, 2012. 2 pages.
Parappa the Rapper: PaRapper the Rapper Is finally here, but does it live up to the hype? by Adam Douglas. Retrieved from the Internet http://m.ign.com/articles/1997/11/19/parappa-the-rapper. Retrieved on Jun. 8, 2012. 2 pages.
PopCap Games Site Review via www.download-free-games.com, retrieved on Mar. 3, 2006]. Retrieved from the Internet <URL:http://www.download-free-games.com/reviews/popcap_games.htm>. 2 pages.

Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStation. Retrieved from the internet: http://www.yesasia.com/us/rez-playstation2-the-best-japan-version/1002847668-0-0-cssid. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by.David Smith. Retrieved from the Internet: http://m.ign.com/articles/2002/01/09/rez. Retrieved on Jun. 11, 2012. 3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langld. Retrieved on Feb. 22, 2005. 1 page.
SingStar Review (PS2) by James Hamer-Mortonl. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=fro_gle4. Retrieved on Feb. 22, 2005. 1 page.
Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmatters.com/multimedia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet http://games.channel.aol.com/review.adp?qameID-7569. Retrieved on Feb. 22, 2005. 3 page.
Thalmann, "L'animation par ordinateur" http://web.archive.org/web/20060421045510/http://vrlab.epfl.ch/{thalmann/CG/infogr.4.pdf>, Apr. 21, 2006 (52 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" <http://www.youtube.com/watch?v=B4phOjfVNLk>. Last accessed on Nov. 8, 2012.
Video <http://www.bing.com/videos/search?q=dance+instruction+game &mid=E69356CFA1B6719FF5C8E69356CFA1B6719FF5C8 &view=detail&FORM=VIRE5> (uploaded Jul. 27, 2010).

(56) References Cited

OTHER PUBLICATIONS

Video Alvin and the Chipmunks Chipwrecked—Majesco Sales: release—Nov. 2011 (http://www.youtube.com/watch?v=xKeW3CUt14A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtube/2ChliUgqLtw).
Video Just Dance: Nov. 2009 (http://youtube/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video Michael Jackson: The Experience—Ubisoft, Ubisoft Paris, Ubisoft Montpelier; <http://www.youtube.com/watch?v=AS3-SuYhSBk> . Date not available.
Video MJ—Paris Week game demo—Oct. 29, 2010 http://www.dailymotion.com/video/xfg4oe_pgw-10-michael-jackson-experience-kinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6gQ>; Michael Jackson The Experience Video Game—Kinect for Xbox 360—Gamescom 2010 HD.
Video MJ:TE on Wii (Nov. 2010); <http://www.youtube.com/watch?v=gmIMNGWxgvo>.
Video N.Y. Comic Con '10—Billie Jean Gameplay Demo: <http://www.gametrailers.com/video/nycc-10-michael-jackson/706056>. (Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud69OK02KGg&feature<fvst).
Video We Cheer 2 (Released Nov. 3, 2009 for Wii) <http://www.youtube.com/watch?v=-4oalxqnbII>.
Video Dance Dance Revolution: Hottest Party 3 (Released Sep. 27, 2009 for Wii) <http://www.youtube.com/watch?v=zk20hEzGmUY>.
Virginia Tech Multimedia Music Dictionary: "P: Phrase" Virginia Tech University, http://www.music.vt.edu/musicdictionary/textp/Phrase.html. Retrieved May 25, 2011 (7 pages).
Dance Dance Dance Revolution Max, Game Manual, released in the US by Konami Corporation, Oct. 29, 2002 (2 pages).
Taiko Drum Master Game Manual, Release Date Oct. 24, 2004 (18 pages).
Video: Michael Jackson The Experience: Song Menu [North America]. Available at <https://www.youtube.com/watch?v=pFlc7YId2aw>, accessed Jun. 21, 2016 (1 page).
Craymer, et al., "A Scalable, RTI-Compatible Interest Manager for Parallel Processors", in Proceedings of the 1997 Spring Simulation Interoperability Workshop, 97S-SIW-154, 1997 (4 pages).
Petty, et al., "Experimental Comparisons of d-Rectangle Intersection Algorithms Applied to HLA Data Distribution", in Proceedings of the 1997 Fall Simulation Interoperability Workshop, 1997, 97F-SIW-016 (14 pages).
Singhal, Effective Remote Modeling in Large-Scale Distributed Simulation and Visualization Environments, PhD Thesis, Stanford University, 1996 (173 pages).
Singhal, et al., Chapters 5, 6, 7, and 8 in *Networked Virtual Environments—Design and Implementation*, ACM Press Books, SIGGRAPH Series, Jul. 1999 (178 pages).
Singhal, et al., "Using a Position History-Based Protocol for Distributed Object Visualization", in Designing Real-Time Graphics for Entertainment [Course Notes for SIGGRAPH '94 Course No. 14], Jul. 1994 (25 pages).
Van Hook, et al., "Approaches to Relevance Filtering", in Eleventh Workshop on Standards for the Interoperability of Distributed Simulations, Sep. 26-30, 1994 (3 pages).
Van Hook, et al., "Approaches to TRI Implementation of HLA Data Distribution Management Services", in Proceedings of the 15th Workshop on Standards for the Interoperability of Distributed Simulations, 1996 (16 pages).

\* cited by examiner

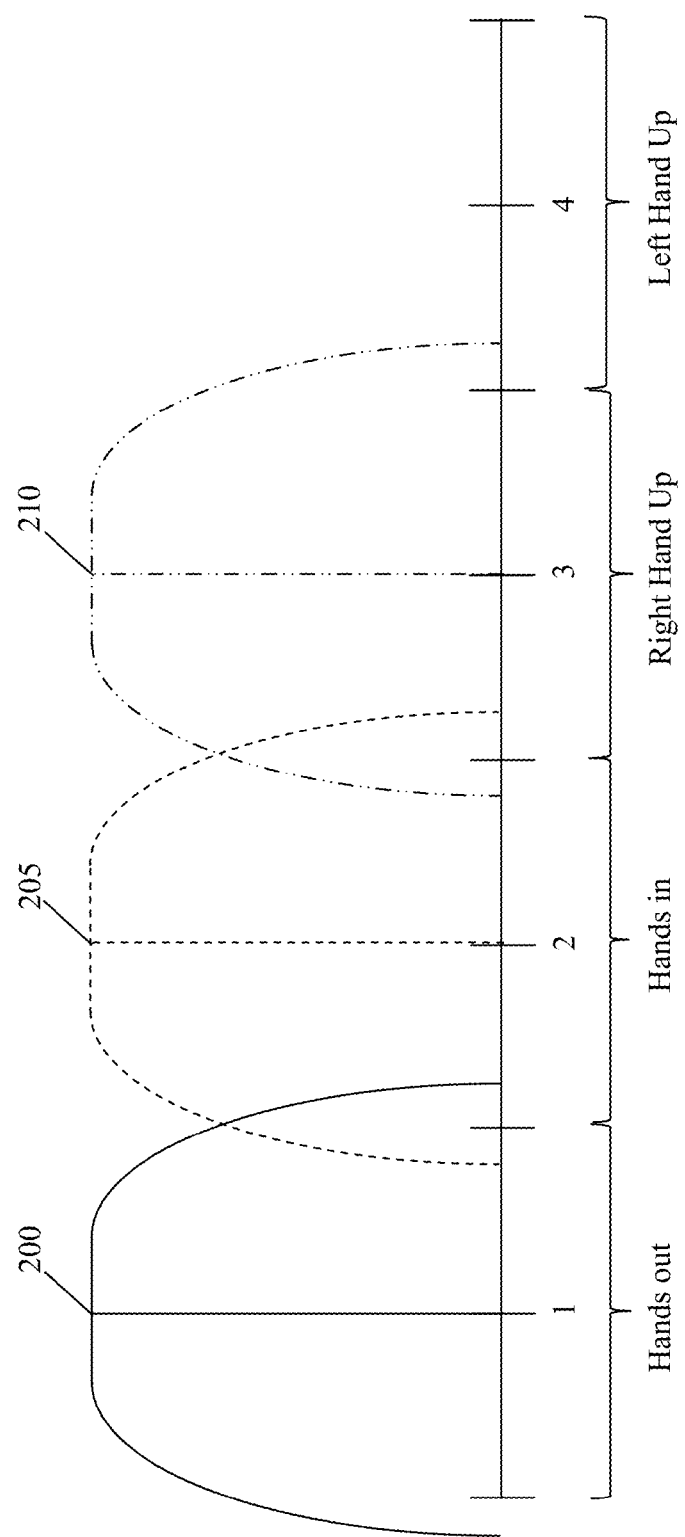

MOVEMENT BASED RECOGNITION AND EVALUATION

CROSS-REFERENCE TO RELATED APPLICATIONS

This application is a Continuation-in-Part of and claims benefit under 35 U.S.C. § 120 of U.S. Pat. No. 8,702,485, issued on Apr. 22, 2014 and entitled "Dance Game and Tutorial," which claims priority to U.S. Provisional Patent Application No. 61/354,073, filed Jun. 11, 2010 and entitled "Dance Game and Tutorial," and is a Continuation-in-Part of and claims benefit under 35 U.S.C. § 120 of U.S. Utility application Ser. No. 12/913,493, filed Oct. 27, 2010 entitled "Gesture Based User Interface," which claims priority to U.S. Provisional Patent Application No. 61/255,462, filed Oct. 27, 2009 and entitled "Gesture Based User Interface" each of which is hereby incorporated by reference herein in its entirety. This application is also related to U.S. Utility application Ser. No. 12/940,809, filed Nov. 5, 2010 and entitled "Dance Game and Tutorial," and U.S. Pat. No. 8,444,464, issued on May 21, 2013 and entitled "Prompting a Player of a Dance Game", each of which is hereby incorporated by reference herein in its entirety.

FIELD OF THE DISCLOSURE

This disclosure relates generally to analysis of movement that is electronically captured and recognition of which movement was performed for purposes of evaluation.

BACKGROUND

Electronic movement capture can occur through the use of sensory information that can include cameras and physical sensors. The resulting images from cameras and motion information from physical sensors can then be analyzed to understand how a body moves through space. In the realm of camera based motion capture, pictures or a video stream from a camera is analyzed to determine the subjects of interest and the changes that occur between the pictures. Sometimes images and sensor information are used together to more accurately understand motion and to more easily distinguish the subject's body from the background. The sensors can be as simple as reflective markers and as complex as accelerometer based sensors that provide information about movement in one or more axes.

As technology has improved for identifying and analyzing movement, the technology has found many uses. For example, the motion capture technology has been used for movies and in video games. Some video games can now detect a user's or player's motions from the use of sensory information. The motion capture information can then be used to allow a player to interact with the system based on the user's movements. The user's movements are then used as inputs to the video game to control actions within the video game. This can increase a user's feeling of immersion in the game and allow a more natural-feeling input mechanism. A problem with motion capture, though, is being able to analyze the information received from the camera and/or sensors in a fashion that provides both accuracy and timeliness.

SUMMARY

This disclosure relates generally to analysis of movement that is electronically captured and recognition of which movement was performed for purposes of evaluation. This type of motion capture, analysis and evaluation can have applicability across a number of fields, such as healthcare, entertainment, communication, and manufacturing. The recognition can occur once movement information collected from sensors is inputted into the system. The system can then analyze the movement information to determine what the movement is. In some games, such as sports games, movement recognition can provide feedback to a user about what they are doing. In other games, such as dance games, movement recognition can allow for users to dance a move from a set of moves providing for a more entertaining game.

In some embodiments, a method executed on a game console is disclosed that includes instructing a display to display a current set of dance moves that are available for performance during a song, receiving at a dance game executing on the game console an input performance that includes information relating to a dance move performance, evaluating in the dance game executing on the game console the input performance against a plurality of target performances that each relate to one of the current set of dance moves, and determining a degree of matching between the input performance and each of the plurality of target performances for use in the dance game.

In certain embodiments, logic is disclosed that is encoded on one or more non-transient computer readable mediums and when executed performs the steps including instruct a display to display a current set of dance moves that are available for performance during a song, receive an input performance that includes information relating to a dance move performance, evaluate in a dance game the input performance against a plurality of target performances that each relate to one of the current set of dance moves, and determine a degree of matching between the input performance and each of the plurality of target performances for use in the dance game.

In yet other embodiments, a game platform system is disclosed that is configured to receive movement sensor information including an input performance relating to a dance move performance and including a processor configured to read instructions from memory to instruct a display to display a current set of dance moves, evaluate the input performance against a plurality of target performances that each relate to one of the current set of dance moves, and determine a degree of matching between the input performance and each of the plurality of target performances.

BRIEF DESCRIPTION OF THE DRAWINGS

FIG. 2A shows a series of movements spread over four beats that begin a representative dance move in accordance with certain embodiments;

DETAILED DESCRIPTION

This disclosure relates generally to analysis of movement that is electronically captured and recognition of which movement was performed for purposes of evaluation. This type of motion capture, analysis and evaluation can have applicability across a number of fields, such as healthcare, entertainment, communication, and manufacturing. In particular, in motion capture, it can be difficult to parse through information received from sensors such as cameras and accelerometers to recognize the movement and position information. This is because the amount of information collected from cameras and/or sensors can be rather large and subject to noise. Noise includes information that is not relevant to the motion of interest. For example, if other motion or background information is captured that is not the motion that is of interest, it can distract from the task of recognizing the motion of interest or cause the results to be inaccurate.

Problems also arise when trying to recognize a motion from a number of possible outcomes. When only one motion is the motion of interest, then information collected from the sensors can be constantly analyzed against this target motion. However, when there are multiple motions of interest, then recognition becomes a much more difficult problem. For example, capturing a person who is performing sign language and recognizing what the person is saying can be complicated and difficult, especially when noise is present or the system is not calibrated beforehand. Motion recognition among many possible outcomes can have a number of benefits. For example, off-the-shelf games or systems can be created to analyze movements such as baseball player's swing, or a pitcher's throw to identify common problems or to teach new techniques. The multiple motion type recognition can also be used in games for entertainment. These games can include dance games where players can perform dance moves and the game recognizes the dance move performed and scores that dance move.

Figure 1A:
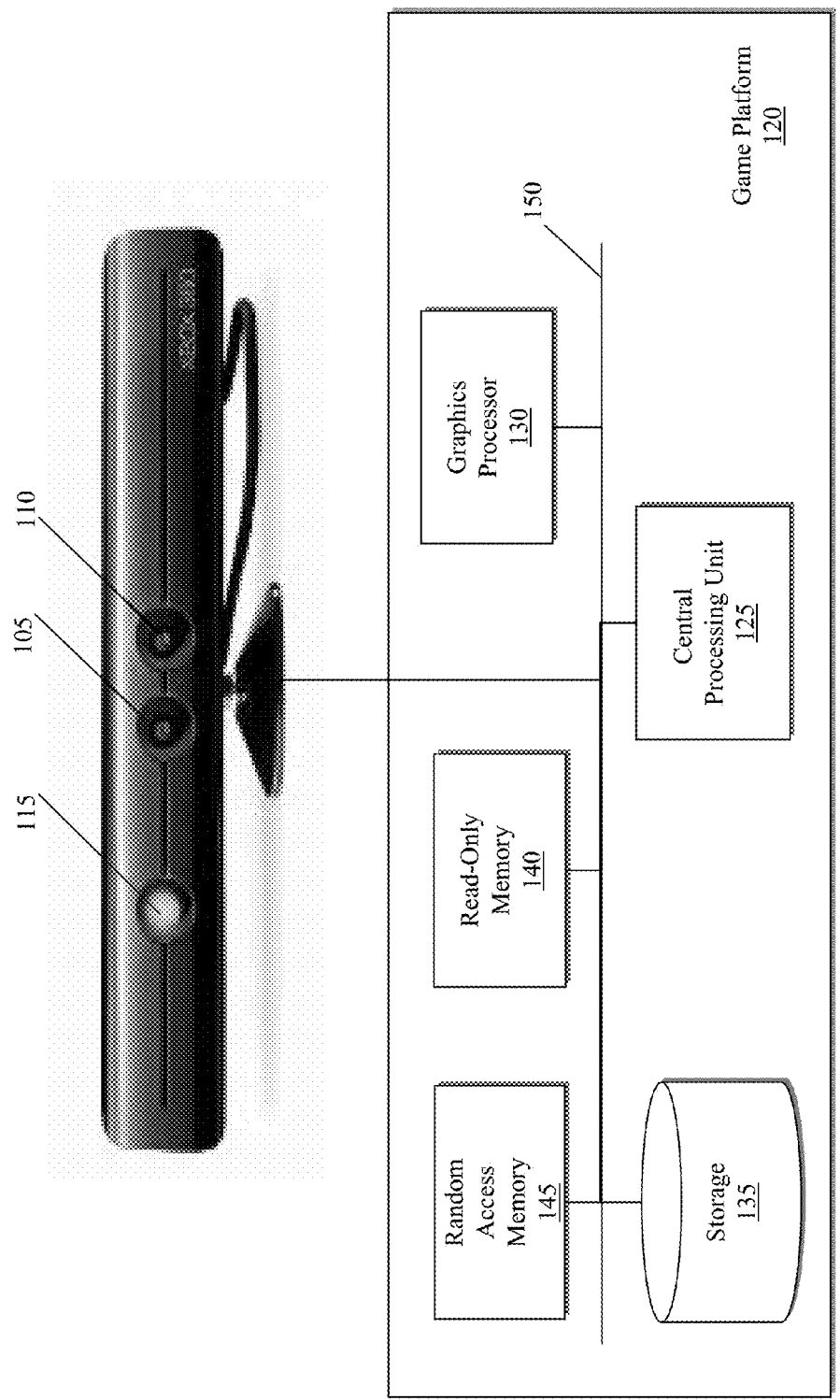
FIG. 1A depicts a game platform with a camera system in accordance with certain embodiments.

In one embodiment, the motion recognition system uses a camera-based system such as the Kinect system developed by Microsoft Corporation of Redmond, Wash. FIG. 1A illustrates a camera-based system in accordance with certain embodiments. FIG. 1A includes a camera 105, a depth sensor 110, a multi-array microphone 115, and a processor (not shown). The camera 105 delivers a video stream to the game console, enabling facial recognition and full-body tracking. In some embodiments, the camera can be an RGB camera that delivers a three-color (Red, Green, Blue) video stream. The depth sensor 110 can include an infrared projector combined with a monochrome CMOS sensor. The depth sensor can provide a game console 120 in communication with the Kinect system the ability to recognize objects in the camera's field of view in three dimensions instead of forcing the game console to parse a two-dimensional video-stream. The multi-array microphone 115 parses voices and sound input, while simultaneously extracting and nullifying ambient noise. The Kinect system also features a processor with proprietary software that coordinates the inputs of the Kinect system and can provide a three-dimensional, skeleton-based system to game developers. Developers can use this system to utilize three-dimensional position information of the joints in the user's body to interact with the game platform. In some embodiments, multiple cameras can be used to create a three dimensional image for the purposes of motion capture.

The Kinect system can provide a framework for determining positional information of a user's body and capturing motion for purposes of analysis. Various embodiments exist for capturing motion through sensors. For example, a camera-based system can be used to determine positional information about the user's body in three dimensions and produce a skeleton model. In other embodiments, transducers attached to the user's body are used to detect the positions of the user's limbs and produce a skeleton model. Other embodiments use infrared pointing devices or other motion tracking peripherals. A system that can parse movement in two dimensions to produce a skeleton model; adding dimension information from a third dimension, typically depth, makes the analysis easier because of the additional information provided to the system. In embodiments where the system is already provided a skeleton, such as with the Kinect system, relative body scale mapping is easier to accomplish.

FIG. 1A also includes a game platform 120. The game platform includes a Central Processing Unit (CPU) 125, a graphics processor 130, storage component 135 such as a hard drive, Read Only Memory (ROM) 140, Random Access Memory (RAM) 145, all in signal communication via a bus 150. The bus 150 also connects to an input for the Kinect system. In some embodiments, the Kinect system connects to the game platform 120, e.g., an Xbox 360, via a Universal Serial Bus (USB) connection.

Figure 1B:
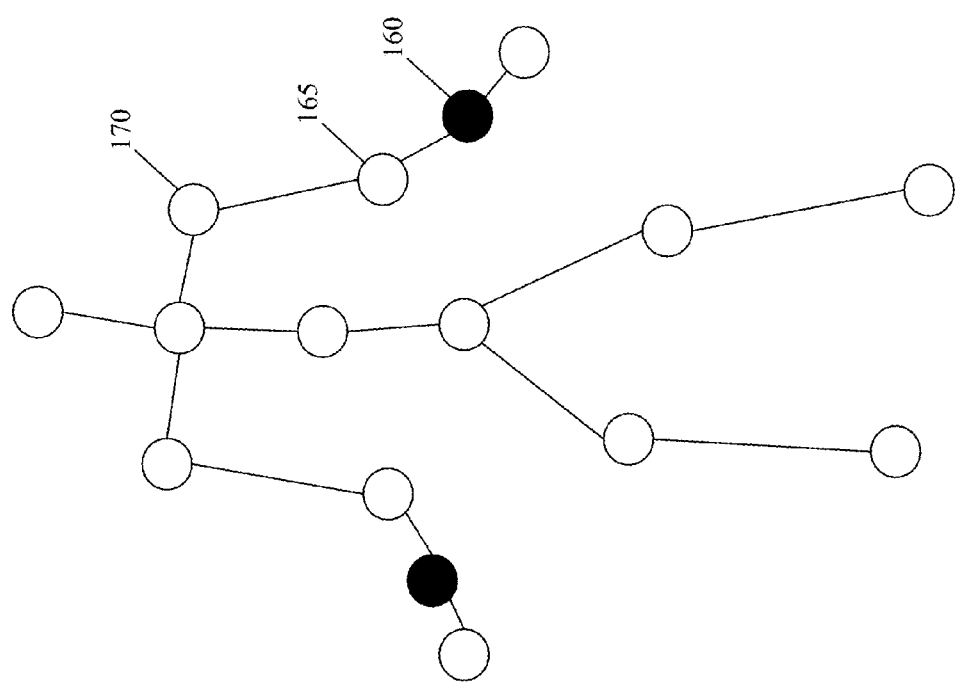
FIG. 1B depicts an example of a skeleton provided by camera system in accordance with certain embodiments.

As used herein, the terms "joint", "bone", and "skeleton" are intended to have the meaning one of skill in the art of motion capture and animation would ascribe to them. For example, a skeleton can comprise bones, but the number of bones and their positions are a function of the motion capture equipment and an animation rig and do not necessarily correlate to the number and positions of bones in a human skeleton. Similarly, a joint can be at the distal endpoint of a single bone (e.g., a fingertip or the head), and may not be at a point where two bones come together. An example of the Kinect system skeleton is shown in FIG. 1B. The skeleton provided by the Kinect system can provides a framework for a dance game, and allows for tracking of not only limbs generally, but specific joints as well. For example, the wrist joint 160 on the right arm is treated separately from the right elbow 165, which is treated differently than the right shoulder 170. Additional portions of the body are also recognized, such as the pelvis, middle of the torso, the head, the neck, and the knees and feet.

One of the benefits provided by the skeleton-based system is that the skeletal model can be used to calculate scale vectors based on two or more joints. This provides a spatially relative system, i.e., what is the positional distance from body part X to body part Y compared to the positional distance from body part X to body part Z, instead of an absolute coordinate system. In some embodiments, the system can be configured to recognize objects attached to the user. These objects can include props that are used by the user with the system. For example, with sports games a baseball bat prop may be used, or in dance games a microphone, costume, or other external prop may be used to perform the song.

A filter can be used to determine whether something occurred at a particular time. For example, is the user's right hand in a particular position at time $t_n$? Although typically a producing a Boolean outcome, e.g., if the condition is true, the filter is satisfied and registers a success, and if not, then the filter is not satisfied. Filters may also output a contiguous score indicating the degree to which the condition is being satisfied spatially or temporally. Advantageously, multiple filters can be checked simultaneously, e.g., is the user's right hand in position x and is his left foot in position y? These filters can then be combined to determine if a user has successfully completed a pose. But pose-matching, in and of itself, is not a complete solution to scoring a sequence of dance moves. A filter can be implemented using an algorithm such as a matching algorithm to determine how close a captured motion or position is to a target motion or position.

In some embodiments, a filter system is used to capture and score what a user is doing. The user's performance is inputted to the system and can be normalized to a reference framework. The normalized input performance can then be compared against a target performance, which has also been normalized to the reference framework. The closer the user's input is to the target move at the target time, the better the rating awarded to the user. The normalization process can allow the game and its filters to behave similarly for different sized users. In one embodiment, appendage and body position determinations can be made based on, and relative to, the skeleton of the person interpreted by the system, not on an absolute coordinate system within the camera's field of view. Other embodiments can utilize an absolute coordinate system for input and analysis. This can be useful in user interfaces. For example, a movement of a hand eight inches can be registered as a swipe, positioning the body on the edge of the camera's field of view can trigger a user-interface event, or stalling over an object with a hand for more than 10 seconds can select an item. These actions can occur regardless of user dimensions, user position, or both.

Typically, ranges are used to determine if a user has successfully performed a move because motion-tracking input can be inherently noisy. In some embodiments, the Kinect system can be a source of noise as well because the visual data that the Kinect is tracking is ambiguous or leads to an inaccurate determination of the user's position or movement. It can be difficult to precisely determine where a user's appendages are due to the natural movement of the user over time and the lag between receiving input and processing the input. This is complicated when the user is trying to perform a particular dance move at a particular time—he may start or end the move too early or too late, or some appendages may be positionally inaccurate, or a combination of these. Therefore, the filter system allows for variation in both timing and position when scoring the user. The filters can be used to recognize an inputted performance against a number of possible target movements to provide a variety of applications. In a dance game, a user can perform one of multiple dance moves and the system can determine the move danced and provide a score for the performance of the dance move.

In some embodiments, there is a mechanism for teaching a specific move or series of moves to a user using audible cues and repetition. To facilitate this functionality, an animation blending technique can be used. The animation blending technique uses animation transitions from an idle state into a move, and from the move into an idle state, along with the animation of the move in the context of the entire dance, to allow the teaching avatar to demonstrate and repeat a single move. There are also scripted transitions or bridge animation segments that allow for seamless reuse of portions of a motion capture performance that may not be adjacent in the performance. These bridge animation segments can be used in a variety of contexts. For example, a difficult dance routine with many different moves can be simplified into a lower difficulty routine by repeating a subset of the moves, which may prompt the use of non-adjacent animation segments. Bridge animation segments can be used in a practice mode to repeat moves until the player has successfully performed them.

Creating a Target Representation

The process of one implementation begins by using motion capture ("mocap") to create a three-dimensional model of a target performance. This can be, for example, the target performance of a dance or part of a dance in a video game. Motion capture can include recording of a human actor which can be used by a computer to reproduce the actor's performance. When the mocap session is recorded, sensors at various points on the actor's body provide the recording computer with information such as joint and limb position data over time. In the case of a dance game, the mocap is typically a recording of a dancer performing a particular dance move, or series of movements that makes up a dance move, and in one implementation, the mocap is a recording of an entire dance routine for a song. The mocap performance becomes a representation of the dance in a form usable by the game system (e.g., as a target performance). In some embodiments, the positional information received during mocap can be similar to the positional information received by a camera-based game system when a user is playing a game or other motion sensor system. This similarity can be exploited to grade inputted motions of a body on how well the body is dancing at a particular time by comparing a user's performance (the input performance) to a key frame of the target performance. Also, the mocap data can be used to drive on-screen animations of avatars, thus demonstrating to the user the movements to be performed.

At least one problem arises that prevents a direct comparison between the input performance and the target performance. For example, the user and the mocap actor could have different heights and appendage lengths, or have different body types, such that a direct comparison of positional information of the input performance and the target performance could result in the user scoring poorly, even if he is performing the moves correctly. For example, the actor in the target performance could have an arm fully extended which, based on the dimensions of the actor's body, positions the actor's wrist two and a half feet in front of his shoulder. The user's input, also reflecting a fully extended arm, could have the (shorter-in-stature) user's wrist positioned two feet in front of his shoulder. In a purely comparative system, the user has not satisfied a test of "is the user's wrist in the same position as the wrist of target performance actor?" because the user's wrist, even though his arm is fully extended, is still a half foot closer to the reference point, i.e., the shoulder. Therefore, it is advantageous to express both the target performance and the user's performance in the same frame of reference.

Normalizing the Input Performance and Target Performance

To create a consistent frame of reference, the mocap data, which is expressed in its own representation (in some implementations even its own skeleton), and the user's input can be normalized. This normalization process creates a normalized target performance and a normalized input performance. In one implementation, normalization of each joint is achieved by deriving unit vectors reflecting offsets of one specific joint relative to another specific joint.

In one embodiment, there are four different player-normalized coordinate systems: left arm, right arm, left leg, and right leg. The left arm coordinate system's origin can be at the left shoulder, the up vector is away from gravity (in a Kinect system this can be based on accelerometer information). The right vector can be from the left shoulder to the right shoulder and the forward vector can be the cross product of the up vector and the right vector. The right arm coordinate system can be the mirror of the left arm coordinate system. The left leg coordinate system's origin can be the left hip, the up vector is gravity, the right vector is from the left hip to the right hip, and the forward vector is the cross product of the up vector and the right vector. The right leg coordinate system can be the mirror of the left leg coordinate system.

Figure 1C:
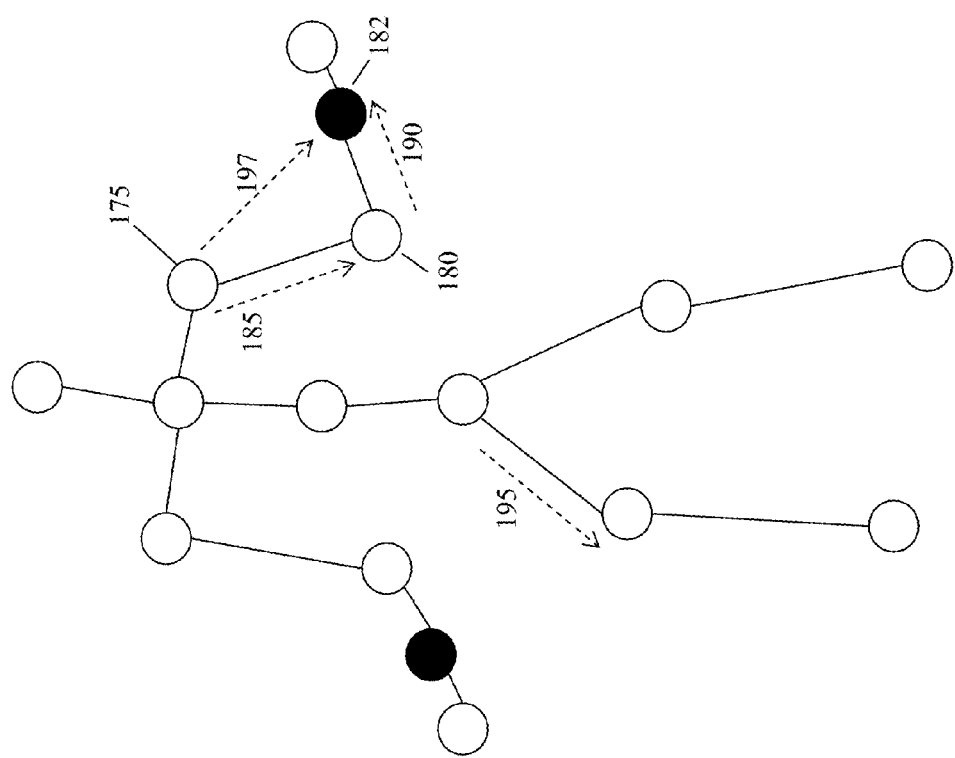
FIG. 1C depicts an example of a skeleton that includes vectors used in determining normalized joint position in accordance with certain embodiments.

As an example, referring to FIG. 1C, the normalized position of joints on the left arm can be determined as follows. The left shoulder joint 175 is treated as the origin of the vector 185 from the shoulder to the elbow 180 and that vector 185 is transformed from the skeleton's coordinate system into the left arm coordinate system. The vector is then normalized by dividing it by its magnitude. The resulting vector is a normalized elbow position. A similar process can be applied to the input skeleton to determine a normalized elbow position for the user.

This method can be used for other joints as well, e.g., the wrist position can be normalized by determining the vector 190 from the elbow 180 to the wrist 182, transforming that vector from the skeleton's coordinate system into the left arm coordinate system, and dividing it by the magnitude of that vector 190. A knee's position can be normalized based on the vector 195 between the hip and the knee, transformed from the skeleton's coordinate system into the appropriate-side leg coordinate system, and divided by the magnitude of that vector. An ankle's position can be determined based on the vector from the knee to the ankle, and so forth. Other joints such as hips are usable as well: foot raises are determined as a "squish" from foot to waist where the foot's position is drawn in towards the waist. In one embodiment, the normalized joint positions in the entire skeleton are computed, using the joint more proximal to the body core as the reference joint. In other embodiments, only a subset of the joints that have a correspondence in both skeletons are normalized, and normalization occurs on a limb-by-limb basis. The normalization of the target performance can be carried out in advance of motion capture, or can be carried out while input performance is received, for example.

There are several options for normalizing joints that are not directly connected to an origin joint. Continuing the previous example with the shoulder 175 being the origin joint. The wrist's position can be normalized by determining the vector 197 from the shoulder 175 to the wrist joint 182, transforming the vector 197 from the skeleton's coordinate system into the left arm coordinate system, and dividing the resulting vector by the sum of the magnitude of the vector 185 from the shoulder to the elbow and the magnitude of the vector 190 from the elbow to the wrist. Alternatively, the vector 197 from the shoulder to the wrist can be determined, transformed, and divided by the magnitude of that vector 197. For legs, an ankle position can be based on foot position, transformed from the skeleton's coordinate system into the appropriate-side leg coordinate system, and divided by the sum of the magnitudes of the vector from the hip to the knee and from the knee to the ankle.

Typically, normalizing the target performance and the input performance yields positional information analogous to both, e.g., both have elbow position representations, both have wrist position representations. Where data is not available in the mocap data or the user input for a particular joint, in some embodiments, the system can interpolate between two joints to create a "pseudo-joint" that maps to a joint in the other skeleton. For example, if the mocap skeleton has a left hip joint and a right hip joint, but a user skeleton only has a mid-pelvis joint, a mid-pelvis pseudo joint can be synthesized for the mocap skeleton at the midpoint of the two hip joints, and used in further normalization and scoring. Alternatively, pseudo-joints could be interpolated from both data sets/skeletons to map to a third idealized skeleton. Additionally, where the system includes a Kinect system, adjustments are typically made to conform the mocap skeleton to the Kinect provided skeleton. For example, the adjustments can include dropping the hips, adjusting the shoulder height, and others. In some embodiments, the system can be implemented to create a pseudo joint in order to provide a reference point or measurement that is more stable than a joint in the existing skeleton.

Comparing the Input Performance to the Target Performance

In order to compare an input performance to a target performance, the information in the performances can be broken into discrete units for purposes of comparison. The discrete units can be samples, such as time based samples or magnitude based samples. Magnitude based samples includes a set of magnitude thresholds that when exceeded creates a sample point of the magnitude and time. The magnitude measured can be an amount of movement that is registered in the input performance. Where spatial information is being used, frames of the input performance can be compared with a corresponding frame of the target performance. A frame can be a snapshot of motion capture sensor information at a particular point in time. These input performance and target performance frames can be analyzed to produce a score. This strategy, however, may not allow the system to account for inaccuracies in the relative timing between the input performance and the target performance. This timing problem can arise, for example, when dancing a move with perfect position but slightly late or early relative to when the move was expected by the system. This can be addressed by scoring each frame of the input performance against the corresponding frame of the target performance and a range of adjacent frames. The scoring process incorporates positional and temporal score using a technique described below. For a given target frame, a score is determined by finding the maximum score of all input frames scored against that target frame.

This approach, however, can be prohibitively expensive computation-wise on some game consoles. To alleviate this, in some embodiments, only a fraction of the input frames are compared with target frames (e.g., half of the input frames). The specific frames in the input performance that are chosen for comparison can be regularly spaced, or the frames can be chosen randomly with a probability matching that fraction. This approach, however, may not capture the intent behind a dance move where certain intermediate poses are important and the transition movements into or out of those poses are less important. In one embodiment, the input frames are compared to a select group of (one or more) target frames that are considered important to the dance move.

In one embodiment, each frame of the target performance can be assigned a weight (e.g., in the range 0.0 to 1.0). Each target frame can then receive a score based on the maximum score of all input frames scored against that target frame. That score is multiplied by the weight to produce a weighted score for each target frame. The score for a move can then be determined by combining the weighted scores using a sum or average. In some embodiments, each frame of the target performance can also be assigned a weight (e.g., in the range 0.0 to 1.0) that is computed based on the target performance. The weight for a frame of the target performance may be computed based on any number of neighboring frames of the target performance. The computation determines which target frames are the most important to the dance by detecting inflections in direction of parts of the target skeleton, or inflections in distance between parts of the target skeleton.

For example, the initial weight for a frame may be 0.0. A velocity vector can be computed for each joint in a target frame by subtracting its position in the previous frame from its position in the current frame. Whenever any joint's velocity experiences a derivative of zero with respect to time, or whenever the joint decelerates to zero velocity, along the x, y, or z axis in the camera-based coordinate system, or along the x, y, or z axis in the skeleton-based coordinate system (see below for a technique for computing a skeleton-based coordinate system), that frame's weight is increased. For example, if the weight of the target frame before considering the joint was w0, the new weight might be (1+w0)/2, or it may be set to a predetermined "one joint zero-derivative" value such as 0.5. If another joint's velocity simultaneously experiences a derivative of zero, or if another joint simultaneously decelerates to zero velocity, the frame's weight is increased by substituting the previous weight into (1+w0)/2 again, or it may be set to a predetermined "two joint zero-derivative" value such as 0.75.

Likewise, additional joints that experience simultaneous derivatives of zero, or decelerations to zero velocity, make the current frame have a higher weight using the formula or a lookup table that references number of contributing joints to a weight value between 0.0 and 1.0. A temporal threshold may be used to determine whether joints that experience derivatives of zero, or decelerations to zero velocity, have done so simultaneously. For example, any two joints experiencing derivatives of zero or deceleration to zero velocity within half a second may be considered to have done so simultaneously.

Although derivatives of joint positions can be used to determine the weight for a frame of the target performance, other measurements can also contribute to the weight. For example, distances between specific joints can be computed for each frame and tracked across frames, and zero-derivative measurements can contribute to the weight. For example, the distance between wrist joints may be measured for each frame. Frames in which the distance experiences a zero derivative would increase the frame's weight by substituting its previous weight into (1+w0)/2 or looking up a value from a table as above.

Other measurements can also contribute to the weight, such as zero-derivative measurements of the overall bounding rectangle of the skeleton along x, y, or z axes in a camera-centered coordinate system or x, y, or z axes in a skeleton-based coordinate system. However the target weight is computed, the final weight assigned to each target frame can be used in the same way as described previously.

In one implementation of the system, a subset of the frames of the target performance are marked as key frames. Each key frame represents a specific frame in the target performance with which the input performance is compared.

The target performance, which can include an entire dance routine, can be aligned with a timeline with the performance being divided into moves. Each move can include a start time and an end time relative to the beginning of the dance. The start and end time allows the move to be placed on the timeline. Time in the timeline can be measured in units of measures/beats/ticks. Alternatively, each move can have a start time and a duration. The times and durations are typically measured in units of measures, beats, and ticks, but alternatively can be measured in units of seconds. Time can be measured relative to the beginning of the dance, but alternative reference points are possible, such as the end of the dance, the start of the previous move, the end of the previous move, or any other moment in time within the timeline.

Each key frame can include a time offset relative to the beginning of the move. In addition to timing information, each key frame can include weighting information for x, y, and z axes relative to the camera (explained below). Additionally or alternatively, each key frame can include weighting information for x, y, and z axes relative to the entire skeleton in the target performance, or weighting information for x, y, and z axes relative to each "body zone" (limb-centered coordinate systems) in the target performance (explained below). In one implementation, relaxing the scoring is achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

In addition to weighting information for the axes, the key frame also includes weights for different bone groups themselves to emphasize performing a particular motion, e.g., moving the user's arms during the "shopping cart," or deemphasizing other motions one, e.g., ignoring or forgiving poor leg position during "the shopping cart". Key frames can be placed on the timeline to capture the most important poses in the dance sequence. Often, key frames are placed at eighth-note boundaries, but they may be spaced irregularly depending on the dance or move to be tested.

In a preferred embodiment, the target performance is expressed as mocap data associated with a Milo file. The Milo file contains a timeline and allows for events, tags, or labels to trigger events in the game. Advantageously, the target performance is aligned to the timeline. The Milo file is also typically associated with a music track, which is also aligned to the timeline. This allows the developer to assign events to certain portions of the music track. The Milo file also has instructional timelines for providing audio cues to the user (explained below). The Milo file also provides the ability to mark parts of the timeline, and therefore parts of the target performance, as key frames. Key frames are placed at specific measures or beats on the timeline and represent times to test user input.

Comparing the input performance to the target performance input at a particular key frame may be accomplished in several ways. In one embodiment, each key frame has a time window associated with it, beginning before the key frame and extending beyond it. The time window can be symmetrical around the time of the key frame, but may be adjusted to provide for more time at the beginning or end of a dance move. For example, the adjustment can provide a longer intro if a move is difficult to get into or for a longer outro if the move is difficult to get out of. The time window is typically of a fixed width in seconds. Alternatively, the time window can be expressed as fixed width in a variable unit of time such as beats, so that the window expands and contracts as the dance tempo slows down or speeds up, respectively.

FIG. 2A shows a series of movements spread over four beats in accordance with certain embodiments. The first beat is a move marked "hands out", the second is a move marked "hands in," the third is a "right hand up", and the fourth is "left hand up" move. These series of moves together comprise a dance move called "Push It." As shown, "Push It" is a four beat dance move including a series of different movements over each beat of the song. In FIG. 2A, three key frame windows are displayed, each centering on a beat: the first key frame 200 is for the "Hands out" move at beat 1, the second key frame 205 is for the "Hands in" move on beat 2, and the third 210 is for the "Right hand up" move on beat 3.

The umbrella shapes in FIG. 2A show the temporal score weighting curves. The temporal score weighting curves provide a range of scoring depending on when a user begins a move relative to when the move should be performed. The weighting curve can capture the temporal offset between the frame of the input performance being evaluated and the frame of the target performance that the input performance frame is being evaluated against. The frame of the target performance being evaluated against can be a key frame of the target performance that corresponds to a particular movement in the dance move. The weighting curves allow a user who times a movement well to the song to get full credit, while giving lesser scores to users who perform a movement either too early or too late relative to the beats of the song.

The user's input can be sampled to obtain input performances that can be evaluated. The samples of the sensory information can be considered frames of information in some embodiments. The user's input, sampled a certain number of times per second, e.g., 30, is examined to determine if it matches the target performance. For example, on beat 1 (and for a period before and after beat 1 illustrated by the umbrella around 200) the user's input is sampled to determine if, in this case, the user's hands are stretched out in front of him in a way that matches the target input which is based on the mocap performance. Then, on beat 2 (and before and after), the user's input is sampled to determine if it matches the target performance where the user's hands are pulled back in. The windows around each key frame are to allow for variation in time for the user to complete the move. Variation is allowed for in both time and positional displacement because the user may not have their limbs exactly in the expected position at exactly the right time. Additionally, as stated above, some leeway is provided because the camera is an inherently noisy input.

Allowing for Variation in Time

Figure 2B:
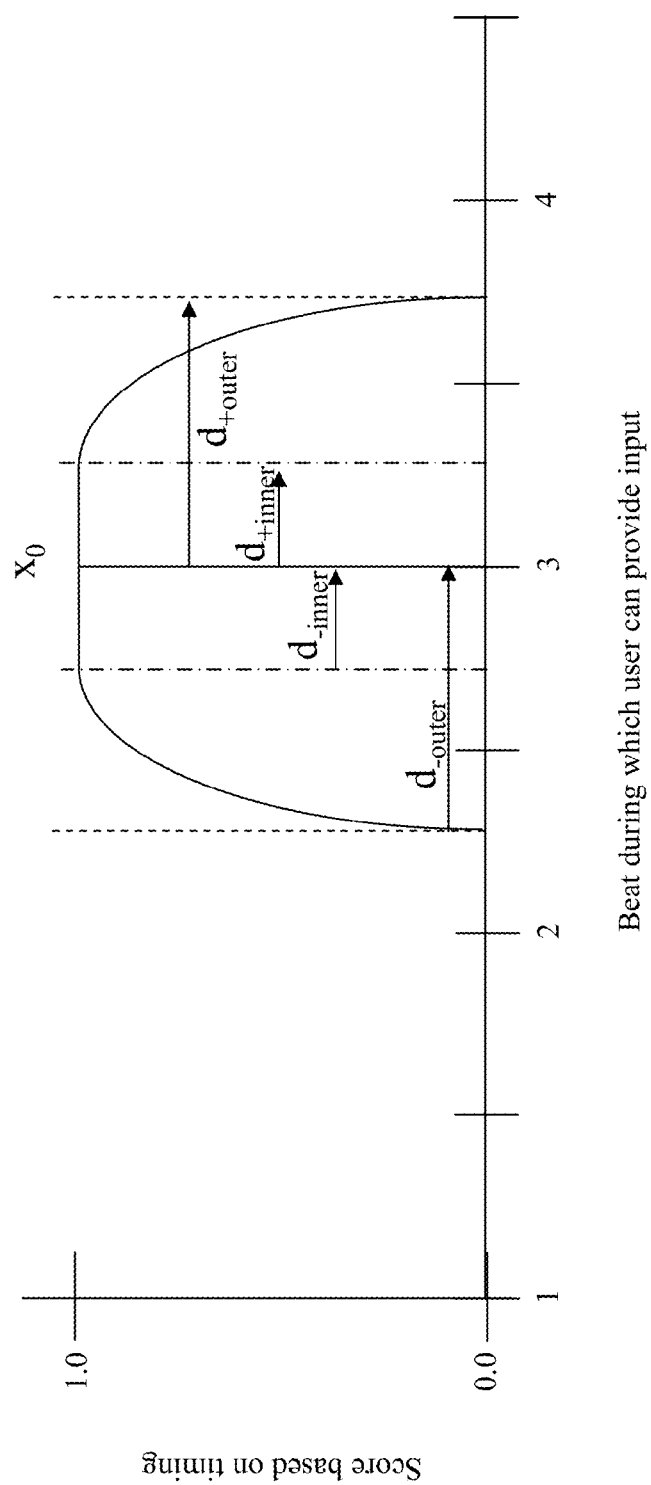
FIG. 2B shows a representative window to determine a user's timing error in performing a move in accordance with certain embodiments.

FIG. 2B illustrates a representative window to determine a user's timing error in performing a move in accordance with certain embodiments. Referring to FIG. 2B, if any of the user's inputs match the target performance within a certain inner time window around the key frame, e.g., in the range $d_{-inner}$ to $d_{+inner}$, the user is given full score for performing that portion of the move that aligns with that key frame (+/– to allow for the user to reach the move early or late, and the allowances either before or after are not necessarily symmetrical). This is accomplished by examining each frame of input during the window and selecting the closest match.

Between an inner time window and an outer time window, e.g., in the range $d_{-outer}$ to $d_{-inner}$ and the range $d_{+inner}$ to $d_{+outer}$, a score is still given for performing the move, but the score for that performance is reduced as the temporal "distance" outside the inner window increases. Outside the outer windows, i.e., before $d_{-outer}$ and after $d_{+outer}$, respectively, no score (or a score of zero) is given for performing the move because the user is just too early or too late. The fall off function for the score during the periods of $d_{-outer}$ to $d_{-inner}$ and $d_{+inner}$ to $d_{+outer}$ is typically a variation of $1-x^2$. This yields a parabolic shape that starts from 0 and builds to 1 between $d_{-outer}$ and $d_{-inner}$, and then falls from 1 to 0 between $d_{+inner}$ to $d_{+outer}$. More specifically, in one embodiment, the scoring curve is assembled piecewise:

For frames before $d_{-outer}$, $y(x)=0$.
For frames between $d_{-outer}$ and $d_{-inner}$:

$$y(x) = 1 - \left(\frac{x - x_0 + d_{-inner}}{d_{-outer} - d_{-inner}}\right)^2.$$

For frames between $d_{-inner}$ and $d_{+inner}$ (including $x_0$), $y(x)=1$.
For frames between $d_{+inner}$ and $d_{+outer}$:

$$y(x) = 1 - \left(\frac{x - x_0 - d_{+inner}}{d_{+outer} - d_{+inner}}\right)^2$$

For frames after $d_{+outer}$: $y(x)=0$.

But other variations are possible as well, e.g., a linear function, a constant, a parabolic function, a square-root, 1/x, 1/(x$^n$) (e.g., inverse square, inverse cube, etc.), polynomial, exponential, logarithmic, hyperbolic, Gaussian, sine, cosine, tangent, or any combination or piecewise combination thereof.

Beneficially, in some embodiments, as shown in FIG. 2A, the windows for key frames can overlap, e.g., key frame 205 overlaps 200. In these cases, an input frame in the overlapping area is scored against both key frames. The maximum score of the input frames that are scored against a given key frame is assigned as the score for that key frame. Any key frame that the received input performance matches can be considered an active key frame. Active key frames can then be considered for evaluation and scoring.

Allowing for Variation in Position

As discussed above, the user's positional success can be determined based on comparing the normalized input performance to the normalized target performance. When comparing the input performance to a key frame (again, preferably done for each sampling of the input performance), the aggregate distance is taken between the two to determine how close the normalized input performance is to the normalized target performance of the key frame. This can be done for the whole skeleton of the target performance or can be done on a limb by limb basis. Distances are calculated as the Euclidean distance between the normalized input performance's joint position in the input frame and the normalized target performance's joint position in the key frame.

Figure 3A:
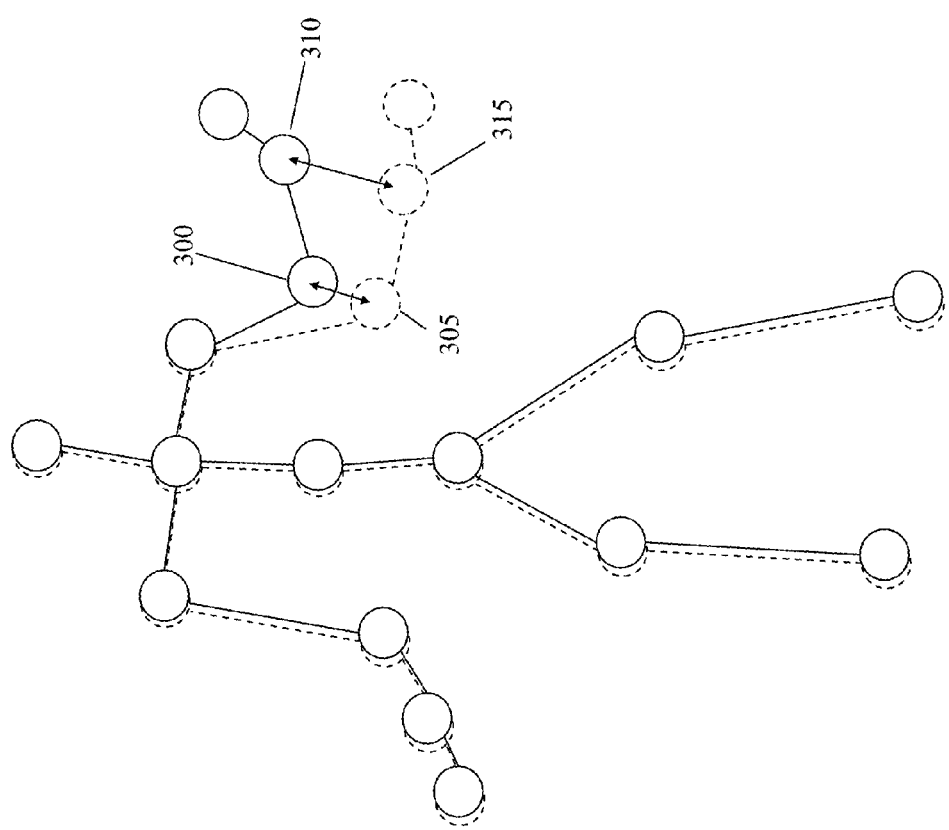
FIG. 3A shows a distance calculation between the target performance skeleton (shown in outline) and the user's input (shown solid) in accordance with certain embodiments.

FIG. 3A shows a distance determination between the target performance skeleton (shown in outline) and the user's input (shown solid). The distance between the user's elbow joint 300 and the target performance skeleton's elbow 305 is determined, reflecting the error the user is committing in terms of positioning his limb. If a filter is just testing elbow position, the analysis stops with comparing 300 and 305. If the filter also tests wrist position, the distance is determined between the user's wrist position 310 and the target performance skeleton's wrist position 315. As shown in FIG. 3A, the user's elbow position is only slightly off the target performance's elbow, whereas the user's wrist significantly out of position. These differences are then used to determine how well the user is satisfying the filter. Although arms are shown in FIG. 3A, differences between the user's leg and the target performance's leg can be determined in a similar fashion.

For hips, hip velocity is a vector from the hip position in the previous key frame to the hip position in the current key frame. The vector can be divided by the amount of time elapsed between the key frames. To normalize the hip velocity, the velocity vector can then be divided by the length of the spine. Then the resulting vector is then used for Euclidean comparison similar to that described with respect to arms and legs. Advantageously, dividing by the length of the spine normalizes the velocity measurement to account for the size of the user, e.g., a child needs to displace his hips a smaller amount than a taller adult, in order to receive the same score.

In some embodiments, the total skeleton score is an aggregate (e.g., sum) of five different scores, i.e., left arm score, right arm score, left leg score, right leg score, and hip velocity score. These are each made up of score calculations themselves for the individual joints and represent how well the user performed the move for each body zone. For example, the left arm score is an aggregate of the wrist score and elbow score, and the leg score is an aggregate of the knee score and ankle score. Displacement of the body, measured by hip velocity, may also be incorporated into the score calculation. Also, contributions to the aggregate skeleton score by the aggregate body zone score may be weighted per key frame to enhance the contribution from zones that are more important to executing the key frame pose.

For example, if the left arm is most important to a particular pose, the weight of its contribution to the score can be increased, or contributions of other body zones' scores can be decreased, or some combination thereof. Contributions to aggregate body zone score by individual joint score may be weighted per key frame to enhance contribution from individual joint positions. This individual joint score can allow differentiation of importance among individual joint positions in evaluating the key frame pose. For example, the elbow is more important than the wrist for the "Funky Chicken" pose, so the weight of the elbow joint's score can be increased, or the weight of the wrist joint score can be decreased, or some combination thereof. Typically, if a user's joint or body zone is in the correct position, the user can be given full credit for the correct position and the weight of that limb's contribution will not be decreased.

Figure 3B:
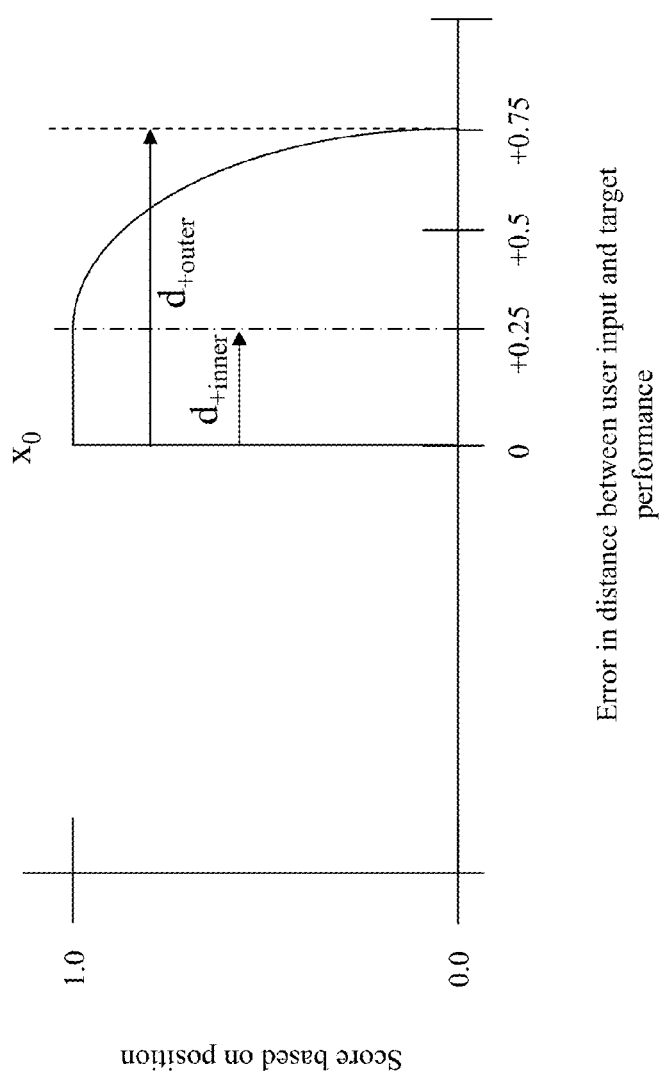
FIG. 3B shows a window of acceptable error for position when performing a move in accordance with certain embodiments.

As with the evaluation of timing error of an input performance with respect to a target performance, there can be a window of acceptable error for position. FIG. 3B illustrates a window of acceptable error for position when performing a move in accordance with certain embodiments. The error for position is determined based on the distance between the normalized input joint position and the normalized target joint position. If the distance is below a threshold (using the same convention as timing: $d_{+inner}$), e.g., 0.25 or less, the error is considered zero for that joint, so input frame receives a 100 percent score. If the distance is greater than the $d_{+inner}$, the score will fall off quickly as the distance increases to some outer boundary, $d_{+outer}$. Between $d_{+inner}$ and $d_{+outer}$, the input frame still receives some score, but the further the scored limb or joint is from the target position, i.e., the closer it is to $d_{+outer}$, the less score the user receives. Once the joint's position is so far off position that the distance falls outside $d_{+outer}$, the user receives no score (or zero score) for that frame. Unlike timing errors, which may represent times before or after the key frame and may therefore be positive or negative, distances are positive.

The score of an input from for a particular key frame can be determined by aggregating the positional score and the timing score. In a preferred embodiment, the positional score for an input frame compared against a particular key frame is then multiplied by the timing score for that input frame to produce an overall score for the input frame for that key frame. If the score for an particular input frame is greater than the score of any other input frame for a particular key frame, i.e., that input frame is the closest to the key frame in terms of the combination of weighted timing and position scores, that score is the assigned score for that key frame and is used to determine the player's overall score for the move. When the user has satisfied a certain percentage of the filters for the bar, e.g., 80 percent, the user is considered to have successfully performed the entire move for that bar (because it is unlikely that a user will satisfy 100 percent of the filters). In implementations with graduated feedback (discussed below), completing 80 percent may be "Perfect," 60 percent may be "Good," 40 percent may be "Fair," and 20 percent may be "Poor."

Compensating for the Limits of the Camera and User

Techniques are provided that can ease the limitation of the user's ability to parse input presented on the display. Certain movements of the on-screen dancer along the z axis (into and out of the screen) can be difficult for the user to parse precisely. For example, when the avatar's arm is held out directly in front of its body, and the wrist is then moved closer to or further from the avatar's body along the z axis, the degree of that motion is hard to see from the user's perspective. This can be problematic for a dance game because the user may encounter difficulty in replicating this movement as the user cannot easily judge the distance to execute the movement precisely.

In one embodiment, this can be overcome by unevenly weighting the contributions of the x, y, and z axes to the Euclidean distance measurement above. This has the effect of flattening the error space in a dimension if that dimension is difficult to detect visually. This is typically expressed as a front-to-back relaxing of the scoring along the z axis because movements in a camera-based system towards the camera (forward) or away from the camera (back) are the ones being compensated for. The relaxation of scoring along an axis can be provided by reducing the contribution along that axis by a coefficient in the Euclidean distance calculation. The developer may also specify, for a given key frame, coefficients for one or more axis to reduce or enhance the contribution of error along that axis to the evaluation of the movement.

Techniques are also provided that can ease the limitation caused by occlusion that is inherent to any camera-based input. When a dance move requires one or more parts of the body to be moved behind other parts of the body, the occlusion of the joints makes it very difficult to determine their positions with accuracy. This is problematic because joints can be occluded in normal dance moves, such as when an arm goes behind the back, or when a move requires the user to turn sideways to the camera.

Techniques are also provided that can ease the limitation with a user attempting to reproduce the target performance when the mocap for the target performance was executed by a professional dancer who is very flexible. This is problematic because a professional dancer can place his body in positions that cannot be achieved by a casual user, and therefore the user cannot score well on the move. For example, a professional dancer can touch his elbows together behind his back, but it would be unfair to penalize a typical user for this lack of flexibility, so the scoring for these moves can be relaxed.

In one embodiment, relaxing the scoring is achieved by unevenly weighting the contributions of the x, y, and z axes to the Euclidean distance measurement above, where x, y, and z are taken to be in the mocap performer's frame of reference. The frame of reference of the mocap skeleton is computed per-frame as a rotation about the z axis of the camera's frame of reference. The angle of rotation can be computed by finding the plane created by the shoulders and the center of the pelvis, finding the forward-facing normal, and rotating the frame of reference through the angle from the view plane normal to the forward-facing normal. Alternatively, the frame of reference of the mocap skeleton can be computed by starting with the plane created by both hips and the head. In some embodiments, relaxing the scoring can be achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

Once the frame of reference has been rotated, relaxing scoring along an axis has the effect of flattening the error space in a dimension. For example, if a move requires the elbows to be pulled back very far, relaxing scoring along the z axis in the frame of reference of the mocap performer can reduce the distance the elbows need to be pulled back in order to achieve a good score. The relaxation of scoring along an axis is specified with the key frame information as coefficients for the Euclidean distance calculation. In some embodiments, the game developer can manually weight certain moves to be more forgiving along any axis simply because a move is hard to perform.

In some implementations, weighting can be based on the confidence that the camera system may provide for detecting a joint's position. For example, in some versions of Kinect the camera system provides tracked positional information in the form of a position for a joint and a confidence level that the position is correct. When the joint is off-screen, the Kinect system can also provides an inferred position. When a joint's position is inferred, e.g., when the joint is clipped or occluded, neighboring joints can be examined to better assess where the inferred joint is. For example, if an elbow is raised above the user's ear, there are only a few possible locations of the user's wrist, e.g., straight up above the elbow, down near the user's chin, or somewhere in between. In these scenarios, because the object of the game is to be fun, the maximum positional window, e.g., 0 to $d_{+outer}$, is widened so that the filtering is looser to allow for greater variation in positional differences. Additionally, the inner window of "perfect" position, zero to $d_{+inner}$, may also be widened.

In some embodiments, the system can suspend operation if too much of the skeleton is occluded or off-screen for more than a threshold amount of time. For example, 10 seconds or 6 beats could be a threshold amount of time. The suspension of operation may be preferable to incorrectly evaluating an input performance that suffers from incorrect positioning.

To assist the user in completing moves correctly, per-limb feedback can be given to the user when performing a move. In some embodiments, if the user is not satisfying a filter for a limb, the game renders a red outline around the on-screen dancer's corresponding limb to demonstrate to the user where they need to make an adjustment. In some embodiments, the per-limb feedback is on the mirror-image limb from the limb that is not satisfying the filter. For example, if the user is satisfying the filter for both feet, the hips, and the left arm, but not satisfying the filter for the right arm, the game renders a red outline around the on-screen dancer's left arm. This indicates to the user that his right arm is not correct, since the user is facing the on-screen dancer and mimicking the on-screen dancer in mirror image.

Other per-limb feedback is also possible. In some embodiments, an indicator such as a phantom limb is drawn in the target location. Alternatively or additionally, an indicator is anchored on the errant limb and its direction and length are based on the direction and degree of error in the user's limb position. For example, if the user's wrist is below the target location, the game draws an arrow starting from where the user's wrist is located in the input performance and ending where the on-screen dancer's wrist is in the target performance. Alternatively, in embodiments where a representation of what the user is doing is displayed on-screen, the arrow is drawn starting from the user representation's wrist. In some embodiments, the indicator persists until the user satisfies the filters for the target performance's arms. In some embodiments, the intensity, geometry, material, or color characteristic of the indicator may be changed based on the degree of error for that limb. For example, the color of the indicator may become a more saturated red if the error for a limb becomes greater. Other highlighting may also be used, as may verbal cues such as "get your <limbs> movin'" where <limbs> is any body zone that is not satisfying the filter.

In some embodiments, there can be an indicator that illustrates how well the user is cumulatively satisfying the filters in a move. This indicator can be represented graphically as a ring of concentric circles under the on-screen dancer's feet. The concentric circle can then be modified to graphically depict how well the input performance matches the filters of the move. If the user has satisfied a certain percentage of the filters, e.g., 20 percent, the inner ring of circles is illuminated. When the user successfully performs the next threshold percentage of filters, e.g., 40 percent, the next set of rings is illuminated. This can be repeated such that when the user has successfully performed the entire move, the outermost set of rings is illuminated. A notable side effect is that as the user is satisfying filters, the ring grows under the on-screen dancer's feet. In some embodiments, the success indicator moves with the on-screen dancer, e.g., is based on the position of the mid-point of the pelvis of the skeleton of the target performance, so that the user does not have to look at a different part of the screen to determine how well he is performing. While described in terms of discrete rings, the effect can occur continuously. Also, other shapes or graphical effects may be used, e.g., a meter indicating how many filters are satisfied, and bigger and bigger explosions or fireworks may be displayed to indicate the user satisfying more and more filters. Beneficially, in some embodiments, a qualitative evaluation is also displayed, e.g., good!, great!, or awesome!

The setting of the game may also react to changes in the user's input performance. For example, as the user is satisfying filters, a crowd of spectators may begin to circle or gather near the on-screen dancer. Or the venue in which the on-screen dancer is performing may become brighter, more colorful, or transform into a more spectacular, stimulating, or elegant venue. Correspondingly, if the user is performing poorly, on screen crowds may dissolve and walk away or the venue may become darker, less colorful, or transform into a less spectacular, stimulating, or elegant venue. Changes in venue and setting can based on the consecutive number of moves completed, e.g., after five successful moves the venue and dancers on screen change to an improved mode. After ten successful moves the venue and dancers may change to a more improved mode and so forth. Changes in venue and setting can also be based on the overall score of the input performance, or on the overall score of the input performance as compared to an average performance.

Training Mode

In some embodiments, there is a trainer mode to assist the user in learning a particular movement. For example, in a game system, teaching the user a series of dance moves. In trainer mode, a dance move is demonstrated using the on-screen dancer and audible cues. The user is then expected to mimic the on-screen dancer's movements. If the user performs the move correctly, an indicator indicates he has performed the move correctly. The next move can then be demonstrated and the user may continue practicing. If the user does not perform the move correctly, the move may be repeated and the user can keep trying to perform the move before being allowed to continue.

When the user does not perform the movement correctly, additional instruction is provided. In some embodiments, a verb timeline, normal_instructions, runs simultaneously with the target performance, and has multiple verb labels indicated on it. The verb labels refer to pre-recorded audio samples that have both waveform data and offsets. The offset indicates where the stress—or important accent—is located in the waveform data. For example, if the wave form data represents the spoken word "together," the offset indicates the first "e" sound such that playback of "together" begins before the point of the verb label on the timeline and the playback of the "e" sound aligns with the point of the verb label on the timeline. This allows the developer to specify which point on the timeline a particular syllable of the audible cue falls on. As the target performance is displayed, the waveform data is played back according to the positions of the verb labels and the offsets to provide instruction to the user that is synchronized with the movement of the on-screen dancer.

In some embodiments, a second verb timeline, slow_instructions, runs simultaneously with the target performance and may have a different or more detailed set of verb labels indicated on it. These verb labels also refer to pre-recorded audio samples with waveform data and offsets, similar to those described above. When the user cannot successfully perform a particular move after a threshold number of attempts, the game slows down and the slow_instructions timeline is used to provide additional, more detailed instruction to the user. For example, on the normal_instructions timeline, there may be a verb label that refers to an audio cue of "step and clap." On the slow_instructions timeline, this may be represented by three labels, "left foot out," "right foot together," and "clap." When the game is slowed down, rather than referencing verb labels on the normal_instructions timeline to trigger audio cues, the game references the verb labels on slow_instructions timeline. When the game is slowed down, there is enough time between body movements that the additional instructions can be played. In some implementations, the slowed down audible cues are stored in a different file or a different audio track than the normal speed audible cues. When the user has successfully reproduced the move, the game is sped back up and the norma1_instructions timeline is used, or alternatively, the additional instructions are muted or not played.

Fitness Mode

In some embodiments, there is a calorie counter displayed on the display during the dance game to encourage users to dance. As the user dances, the calorie counter is incremented based on the Metabolic Equivalent of Task ("MET", and generally equivalent to one kcal/kg/hour) value of what the user is doing. As an example, sitting on the couch has a MET value of 1. Dancing and most low impact aerobics have a MET value of approximately 5. High impact aerobics has a MET value of 7. To determine the MET for a frame of input skeleton data, the joint velocities for all joints on the user's input skeleton are summed. To determine a joint's velocity, the joint's position (in three dimensional space) in the previous frame is subtracted from its position in the current frame. This yields a vector. The vector is divided by the elapsed time between the previous frame and the current frame. The length of the resulting vector is the velocity of that joint.

Once the sum is determined, it is exponentially smoothed to reduce transient noise. The result is a mapped to a MET scale of 1 to 7 with, in some embodiments, a sum of 0 mapping to 1 and a sum of 40 mapping to 7, with 1 representing no movement and 7 being a large or vigorous movement. Beneficially, any sum less than five can map to 1 to account for the noise inherent in the input. The mapping can be linear, piecewise linear, or any interpolation function. Using the MET value, and knowing the user's body weight (which can be input via a menu, or can be inferred based on the camera's input and a body/mass calculation), calories burned can be estimated.

METs are converted to calories-consumed-per-second using the equation of (METs*body weight in kilograms)/seconds in an hour=calories/second. This value can then be displayed on the screen, or summed over time to produce a value displayed on the screen for total calories. The value for calories/second or total calories can stored as a "high score" and, in some embodiments, can be used to increase or decrease the tempo of a song or the difficulty of a series of moves. Advantageously, this allows the user to track total calories burned, average rate burned, and other statistics over time.

Reusing Elements of a Mocap Performance

Figure 4:
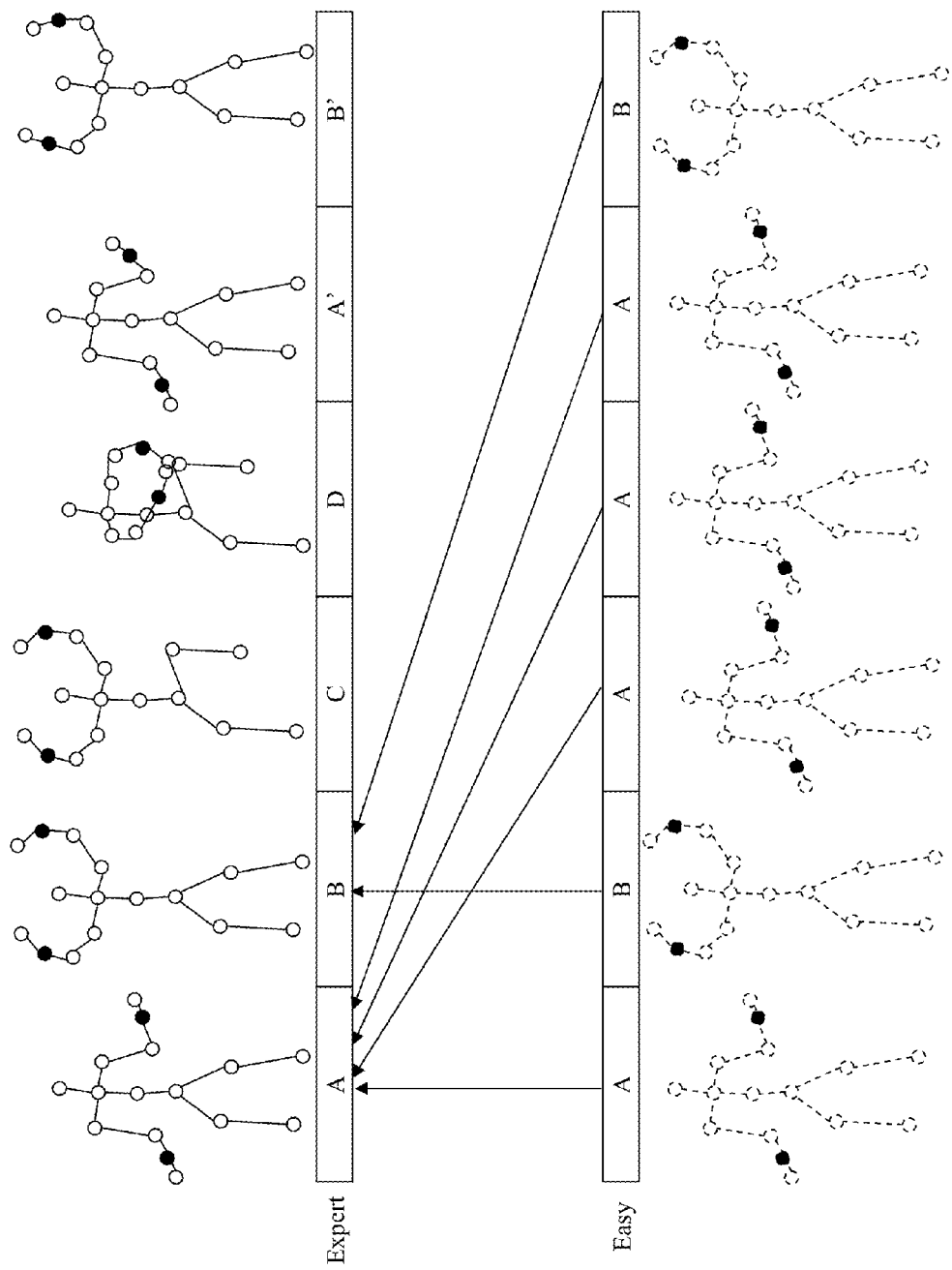
FIG. 4 depicts how motion capture data for a dance routine may be refactored to create a dance routine of an easier difficulty in accordance with certain embodiments.

In some embodiments, the most difficult or complex target performance is recorded as one linear motion capture session and only parts of the recorded performance are used to simulate easier versions of the performance. FIG. 4 illustrates how motion capture data for a dance routine may be refactored to create an easier dance routine in accordance with some embodiments. For example, in FIG. 4, the most difficult or expert dance routine can include a series of movements following pattern of A, B, C, D, A, B, D, C. In some embodiments, these moves are marked on the expert timeline using move labels, which each denote the name of a move animation and where in the timeline the move animation begins. In other embodiments, these moves are marked on a timeline that parallels the expert timeline, called "anim_clip_annotations." Rather than capture multiple target performances for each difficulty level, e.g., a dance with the previous pattern for expert, and progressively simpler sequences for hard, medium, and easy, the game can re-use the motion capture recorded for expert to simulate a pattern for any of these difficulty levels by referring to the move labels on the expert timeline. For example, given the expert sequence above, the easy sequence might be A, B, A, A, A, B, A, A. In other words, for the easy routine, a repetition of the A move replaces both the C and D moves.

The easier routines can be created programmatically, e.g., the game determines how often to repeat a movement based on a difficulty value for the move, favoring easier moves for easier difficulty levels. The easier routines can also be authored by the game developer by creating an easy timeline and referencing the move labels on expert track. An example of this is the easy track in FIG. 4, where the A sections reference the A move in the expert track and the B sections reference the B move. C and D sections, that involve a more complicated knee raise (C) and knee slap (D), are omitted from the easy routine so the user only needs to repeat the "arms out" move of A or "arms up" move of B.

Reusing moves allows space savings on the storage medium (only one target performance needs to be stored) and it allows the game developer to later change the performances of the other difficulties after the game is released if it is later determined that the performance for a difficulty setting is too hard or too easy or is boring. Since the expert performance is linear, each A section in expert will be slightly different because the mocap actor likely did not have his limbs in the exact same position every time. Examples of this are A' and B' where the skeletons are similar to A and B respectively, but the arm positions are slightly different. To make an easier difficulty target performance, the A move that is repeated in the easier difficulties can be A or it can be A', or some combination. In some embodiments, a move that is repeated in an easier difficulty uses the most recent version of that move in the timeline. In some embodiments, a move that is repeated in an easier difficulty uses the earliest version of that move that appeared in the routine. The animations from the expert track can also be reused when creating the easy performance.

A sequence of moves for an easier routine may correspond to a sequence of moves in the original expert linear mocap such that a specific pattern of moves is present in both (although they may not correspond on the timeline). In this case, the sequence of moves may be copied from the expert performance into the desired position in the easier routine's timeline. But if a sequence of moves for an easier routine does not correspond to a sequence of moves in the original expert linear mocap, individual moves may be separately copied from the expert performance into the desired position in the easier routine's timeline. Copying larger sequences of moves from the linear mocap can produce sequences with fewer animation artifacts.

Animation Blending

When moves or sequences of moves are used in easier difficulties, the moves can abut other moves that were not adjacent in the linear mocap. The transitions in the move animations between these moves can be jarring, since the skeleton in the last frame of one move can be in a completely different pose than the first frame of the next move, which would produce a sudden, nonlinear animation. Animation blending can be used to transition smoothly from the end of one move to the beginning of the next move in the sequence, if the two moves were not adjacent in the linear mocap. Using the example above of an expert performance following the pattern of A, B, C, D, A, B, D, C, when creating the easier difficulty performance, there may be a pattern of A, A that is not part of the linear mocap. Animation blending is used to transition from the end of the first A animation to the beginning of the same A animation to produce an A, A pattern. In one embodiment, the last beat of the move before an animation transition is blended with the beat before the beginning of the next move. In the example of the A, A pattern, the last beat of the A move is blended with the beat before the A move for the duration of one beat. Then the animation continues with the first beat of the second A move.

In some cases, the animation blending technique described above produces animations that are still jarring. This is often due to the large differences between the pose at the end of one move and the pose at the beginning of the next move, that can't be overcome through simple blending. In these cases, the animation can appear to jerk from one position to another during the transition, or to move in a way that's physically impossible. In some embodiments, additional mocap is recorded to produce bridge animation segments. A bridge animation segment is designed to make the transition between two other animations smooth. For example, using the example above, if the end of the A move was a very different pose than the beginning of the A move, a simple animation blend might produce a poor result. An A, A bridge animation segment would be recorded, wherein the actor would actually perform the transition from the end of the A move to the beginning of the A move.

In one embodiment, the bridge animation segment is three beats long. The next-to-last beat of the first A move can be blended with the first beat of the bridge animation segment in such a way that contribution from the bridge animation segment is interpolated linearly over the course of the beat from zero percent to 100 percent. The second beat of the bridge animation segment is played without blending, then the first beat of the second A move is blended with the third beat of the bridge animation segment in such a way that the contribution from the bridge animation segment is interpolated linearly over the course of the beat from 100 percent to zero percent. The bridge animation segment may be any number of beats long, for example two beats, and the blending can also be done over the course of any number of beats, for example two beats. The interpolation may be done in a non-linear fashion as well. For example, the interpolation can be done in a parabolic, inverse-squared, logarithmic, or exponential fashion, for example.

In some embodiments, a table is provided that is keyed by the start and end move labels associated with two animations that may abut. If a bridge animation segment is used to produce a smooth transition between the associated animations, the table can include an entry indicating the bridge animation segment to be used. This table can be consulted for the animations that are displayed.

The move animations and the results of the animation blending can be used as the target performance. This allows the move animations and animation blending to be scored. This provides a fluid game experience and rewards users that accurately mimic the dancer on the screen. For example, the scored section can include from the A move to the A move, or from prior move to first A move or from second A move to next move. Since these move animations and animation blending can be used as the target performance, these moves can therefore be scored similarly to the normal game play performance.

In a training mode, it is often desirable to isolate and repeat a move or series of moves, with a gap in between the repetitions. For example, when demonstrating the A move, it is useful for the game to count in the beat while the animation is in an idling state, then execute the move animation, then return to an idle animation. This can be accomplished in a way that is similar to the bridge animation segments described for game play above. In one embodiment, a three beat bridge animation segment of the transition from an idle state to the first beat of a move is recorded as mocap data. This is blended with the idle animation and move animation as described above.

Figure 5:
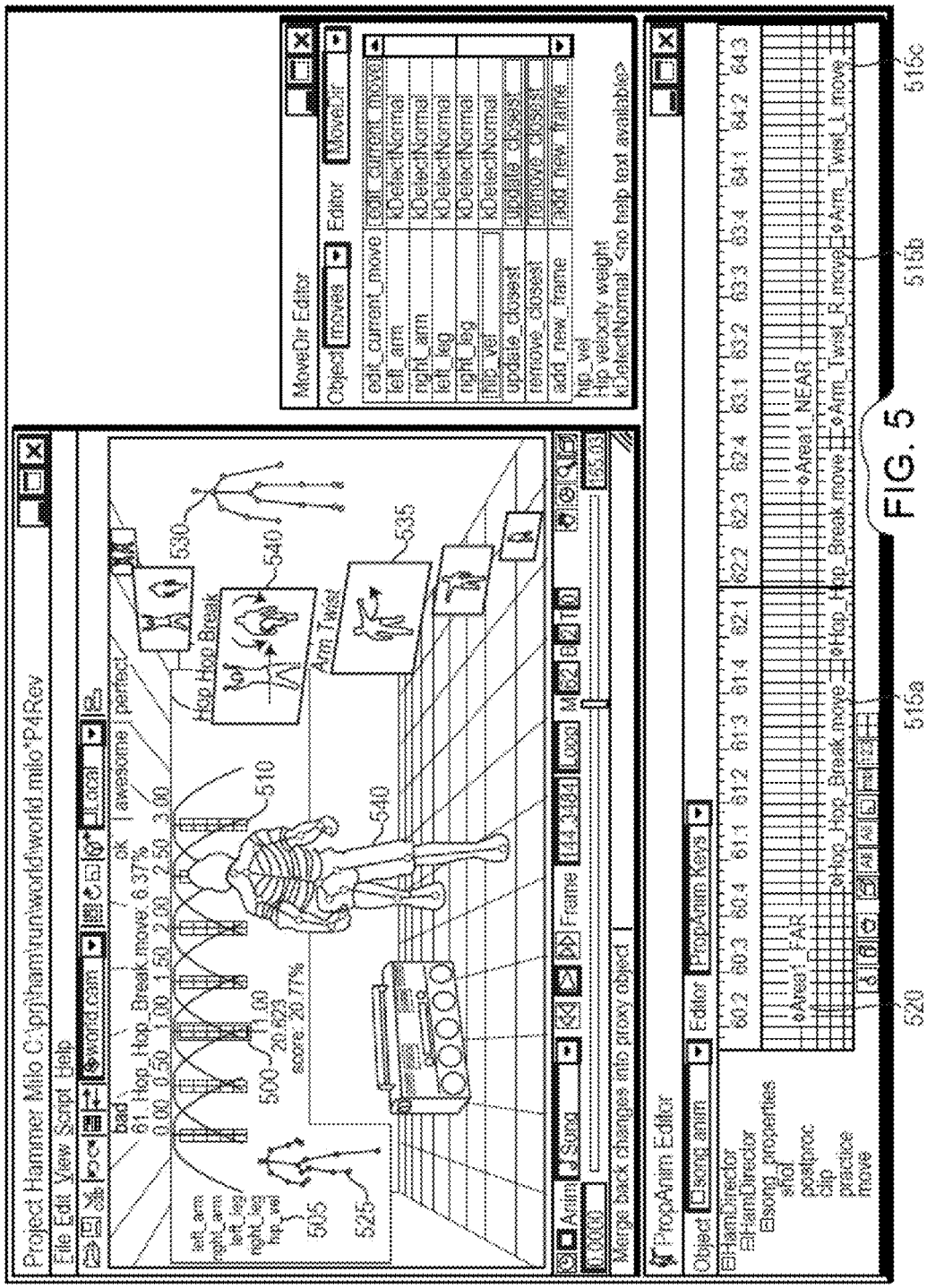
FIG. 5 depicts one embodiment of an authoring system for the dance game in accordance with certain embodiments.

FIG. 5 illustrates an authoring system for the dance game in accordance with some embodiments. In FIG. 5, the key frames 500 are depicted with their respective timing umbrellas. Each body zone being tested 505 is shown as having a corresponding portion of the filter to be satisfied (each square in the rectangle 510). The move is completely satisfied when the body zone filters are satisfied (although in some difficulty settings, only a percentage of the body zone filters need to be satisfied). The labels 515a, 515b, 515c (Hip_Hop_Break.move, Arm_Twist_R.move, and Arm_Twist_L.move, respectively) applied to each move are shown on the timeline 520. As stated above, these labels can be reused to create easier dance routines based on the mocap recording. The mocap skeleton 525 shows the desired joint movements, and the input skeleton 530 shows what the user is currently inputting. Look-ahead icons show the user what move is coming next, e.g., Arm Twist, and the current move icon 535 is displayed prominently. The dancer 540 on screen is a representation of what the user is supposed to input and the skeleton of the on-screen dancer 540 resembles that of the mocap skeleton 525.

Determining an Active User with Multiple Skeletons Available

When more than one user is within the field of view of the camera, it is desirable for the system to determine which user is the active user, and which user(s) are the inactive user(s), for the purposes of shell navigation and game play. For this discussion of determining the active user, a skeleton may be considered valid if it is not sitting and it is facing the camera. In other embodiments, other conditions can be used to define a valid skeleton. Whether a skeleton is valid can impact the ability for a skeleton to be considered active. A skeleton that is not valid may not be able to ever be set to be active. By including a valid skeleton detection mechanism, the system can reduce noise associated with objects that might otherwise be confused as possible skeletons. Queuing a skeleton for activation can mean setting a timer to go off at particular time, at which point the active skeleton is set to be inactive and the queued skeleton is set to be active.

In some embodiments, queuing a skeleton for activation does not set a timer if the skeleton is already queued for activation. In some embodiments, queuing a skeleton for activation does not set a timer if any skeleton is already queued for activation. The timer can be set for a specific time, such as for 1 second in the future. Determining the active user can begin when a frame of skeleton data is received by the system. Once the frame of skeleton data is received the data can be processed at certain intervals, such as every thirtieth of a second. In each frame, there may be any number of distinct skeletons in the skeleton data. In some embodiments, one or more skeletons can be considered active and any remaining skeletons can be considered inactive. There can be more than one active skeleton when more than one user is playing at the same time. In this case, each skeleton represents an input performance and is compared against a target performance.

In some embodiments, if the active skeleton is behind—further from the camera than—an inactive skeleton, or the active skeleton is near the edge of the camera's view, then the system can search for an inactive skeleton to activate. In some embodiments, the active skeleton is considered near the edge of the camera's view if its centerline is in the left or right fifth of the camera's view. If there is an inactive skeleton nearer to the center of the camera's view than the active skeleton, the inactive skeleton can be queued for activation.

When a skeleton is queued for activation, a determination can be made about whether to activate that skeleton. This activation decision can be based on a variety of factors such as if an inactive skeleton that is queued for activation is not present in the current frame, if the skeleton is not valid, if the skeleton is crossing its arms, or if the skeleton is behind the active skeleton. In some embodiments, queued activation of a skeleton can be cancelled if the skeleton meets any of these criteria. In certain embodiments, the queued activation of the inactive skeleton is not cancelled if the active skeleton is near the edge of the camera's view. In some embodiments, if the active skeleton is not in the frame, or if the active skeleton is not valid, but there is at least one inactive skeleton, the system activates one of the inactive skeletons. In certain embodiments, if an inactive skeleton's hand is raised and the active skeleton's hand is not raised, the inactive skeleton is queued for activation or scoring for dancing. This can allow a user to express intent to control the shell or have their performance be the one that is graded by raising their hand.

Multi-Player Modes—Animation

A dance game can be more satisfying if it provides multi-player competitive or cooperative game modes. One difficulty that arises is that the original song and the choreography for the song may not be balanced such that two players can have equal opportunities to contribute to their competing or combined scores (for competitive and cooperative modes, respectively). In addition, the song may be too short to give either player sufficient opportunity to perform for a satisfying duration.

In one embodiment, the song and its choreography can be artificially extended by looping back to previous parts of the song to give multiple players an opportunity to dance the same section. This provides the same potential scoring for the players in a multi-player mode. Although animation blending in this context is primarily intended for looping back to previous parts of a song, the mechanism applies equally well to any non-contiguous jump between points in the song, or jumps between jumps points in more than one song.

In one embodiment, a section that is to be repeated in multi-player mode can be indicated in a data file used to store the tracks and other information used in the dance game. The data file can be a MIDI file. The MIDI file can include a track called multiplayer markers that is aligned with the audio timeline. Alternatively, the markers can be located in the same MIDI track as other MIDI data, can be indicated across multiple MIDI files in respective tracks called multiplayer_markers, or can be located in the same MIDI track as other MIDI data spread across multiple MIDI files. The section indicators are special multiplayer text events, such as MP_START and MP_END. During game play, when the game time reaches the time of the MP_END text event the first time, the game time jumps to MP_START and the other player begins play. When the game time approaches the time of MP_END the second time, it continues without jumping.

In one embodiment, when the game jumps to a non-contiguous point in the song, for example to the point designated by MP_END, animation blending can be used, as described above for creating easier difficulties, to make the transition less jarring. For example, if it is determined that a single section should be repeated, the animation of the last beat of the section can be blended with the animation the beat before the beginning of the first beat of the section. The animation blending can take place over two beats or it can extend over multiple beats. The animation for the end of the section is blended with the animation before the beginning of the section such that the blend begins with 100 percent contribution from the end of the section and ends with 100 percent contribution from before the beginning of the section. The interpolation can be linear, or can use any other interpolating function such as polynomial.

As in animation blending for easier difficulties, the blend from the end of a section to the beginning of the section can produce an unrealistic movement. In this case, bridge animation segments can be used, as discussed above regarding producing an easy difficulty.

Multi-Player Modes—Audio

Extending a song by looping back to previous sections brings with it some inherent difficulties in animation. These difficulties can be eased using animation blending and bridge animations. Non-contiguous jumps in the timeline of the song, or jumps between songs, can also cause difficulties with continuity of the audio track. As with animation, the audio for the end of a section does not always merge smoothly into the audio for a section that is not adjacent in the song's timeline. Jarring discontinuities in the audio track can interfere with the users' enjoyment of multi-player modes. In some embodiments, seamless audio track transition playback is provided during multi-player modes to address this difficulty. For example, if the audio follows the sequence of sections A, B, C, it may be desirable in a multiplayer mode to loop from the end of the B section back to the beginning of the B section.

In some embodiments, a section that is to be repeated in multi-player mode is indicated in a MIDI file in a track called multiplayer_markers, with MP_START and MP_END text events, as described above. In the example above, an MP_START text event in the MIDI file would be aligned with the beginning of the B section, and an MP_END text event would be aligned with the end of the B section, indicating that the entire B section is to be repeated in multi-player mode. Alternatively, a section that is to be repeated in multi-player mode can be indicated across multiple MIDI files, in respective tracks called multiplayer_markers, or can be located in the same MIDI track as other MIDI data spread across multiple MIDI file.

Audio blending can be used to transition between the audio sections in a seamless fashion. The blending can occur in a few different ways. When transitioning from one part of the song to a non-adjacent part of the song, the audio track for a period of time before the origin of the transition is blended with the audio track for the same duration before the target of the transition. Alternatively, the audio track for a period of time after the origin of the transition is blended with the audio track for the same duration after the target of the transition. Other combinations of these two methods are also possible. This is similar to how animations are blended when producing an easy difficulty. For example, one beat worth of audio before the MP_END event could be blended with one beat worth of audio before the MP_START event, then one beat worth of audio after the MP_END event could be blended with one beat worth of audio after the MP_START event. The blending can be done such that at the beginning of the blend, the contribution from the audio before the MP_END event is 100 percent, and at the end of the blend, the contribution of the audio from after MP_START is 100 percent. This can be a linear cross fade, or it can use any other interpolating function, such as polynomial.

In some cases, as with animation blending, the result of audio blending is still jarring. This can be due to the discontinuity in the harmonic progression of the song when moving to a different place in the music or the presence or absence of vocal or instrument parts before or after the transition. In some embodiments, as with bridge animation segments, additional audio is recorded to produce waveform data for a bridge audio segment. The bridge audio segment is designed to make the audio transition between two non-adjacent parts of the song sound smooth. Using the example above with sections A, B, and C, if the game will repeat section B, a bridge audio segment can be provided that smoothly transitions from the last part of section B into the first part of section B.

In one embodiment, the waveform data for bridge audio segments are included in one or more additional bridge audio tracks in the multi-track audio data, and the bridge audio tracks are muted unless non-sequential looping is taking place. However, each bridge audio segment can be located in its own file referenced by the game authoring or the bridge audio segments can be located in a single file. When the bridge audio segments are located in a single file the offset and duration of each segment of bridge audio in the single file can be stored as unique text events in the MIDI file in order to locate the different bridge audio segments.

In some embodiments, the bridge audio segments are of a fixed duration in beats, with a fixed number of beats before the transition. In these embodiments, the original song audio is played until a fixed amount of time in beats before the end of the transition. Then the original song audio track or tracks are muted, and the bridge audio segment is played until the transition point. Then the current time is moved to the target of the transition and the remainder of the bridge audio segment is played. At this point, the bridge audio track is muted and the original song audio track or tracks are unmuted. For example, the bridge audio segments might be three beats long, with one beat before the transition.

Using the example above with sections A, B, and C, if the game repeats section B, a 3-beat-long bridge audio segment from the end of B to the beginning of B may be provided. The original audio tracks are muted and the B-to-B bridge audio segment is played one beat before end of B. When the end of B is reached, the current time is moved to the beginning of B, and the bridge audio segment continues playing for two more beats. After the two beats, the bridge audio track is muted and the original tracks are unmuted. Aligning the audio and changing the current time in this way can allow for a single, consistent timeline for audio playback, animation, and other aspects of game play. Alternatively, the current time may be changed at the end of the bridge audio segment's playback and moved directly to two beats after the beginning of B section. This example discusses bridge audio segments that are all 3 beats long, which start playing one beat before the transition, but other embodiments may have bridge audio segments that are all longer or shorter, or that all begin earlier or later with respect to the transition.

In some embodiments, the song audio and bridge audio segments may be muted and unmuted, as described. Alternatively, the song audio and bridge audio segments may be mixed, such as by lowering the normal song audio volume to 10 percent and playing the bridge audio segment at 90 percent. It is also possible to cross-fade the song audio and bridge audio segments. For example, the last beat of the B section would start with 100 percent of the song audio and end with 100 percent of the bridge audio segment, then the bridge audio segment would play at 100 percent, then the second beat of the B section would start with 100 percent of the bridge audio segment and end with 100 percent of the second beat of the song audio. The interpolation can be linear, but it can also use any other interpolating function, such as polynomial.

In some embodiments, as described above, the bridge audio segments can be of a fixed duration in beats or seconds. In other embodiments, each bridge audio segments can be of different durations. The ability to specify bridge audio segments of different durations can make it easier to provide a musically seamless transition, using more time if necessary, to achieve the proper harmonic and orchestration transitions, and less if possible, so that the playback departs as little as possible from the original music.

In one embodiment, the waveform data for bridge audio segments is located on a single bridge audio track, bridge_audio, in the multi-track audio data file. The bridge audio waveform data for a given transition is divided into the sub-segment before the transition and the sub-segment after the transition. The sub-segment before the transition is positioned in the bridge_audio track so that it ends at the transition point, corresponding to the MP_END text event in the associated MIDI file. The sub-segment after the transition is positioned in the bridge_audio track such that it begins exactly at the target of the transition, corresponding to the MP_START text event in the associated MIDI file. In some embodiments, where the bridge audio segments are of a fixed duration, the beginning and end of the bridge audio segments is implicit in the fixed duration and the fixed amount of time before the transition, as described above.

In the preferred embodiment, the specification of the beginning and end of bridge audio segments is provided in a MIDI file, in the multiplayer_markers track, although the beginning and end of the bridge audio segments could be in their own MIDI track, or in their own MIDI file whose timeline is aligned with the audio timeline. In the multiplayer_markers track, special multiplayer text events, MP_BRIDGE_START and MP_BRIDGE_END, denote the beginning and end of a bridge audio segment. As the game is played in a multi-player mode, when an MP_BRIDGE_START text event is encountered on the timeline of multiplayer_markers, the original audio track or tracks are muted and the bridge_audio track is unmuted.

As described above, attenuation of the original track or crossfading with the bridge audio track can be used instead of muting and unmuting. Playback continues until the transition point itself, which is indicated by the MP_END text event. At this point, the current time is set to the target of the transition, marked by the MP_START text event, and the bridge audio track continues. When the MIDI MP_BRIDGE_END event is encountered, the original audio track or tracks are unmuted, and the bridge audio track is muted. Note that when the transition is backwards in time, the MP_BRIDGE_END event occurs earlier on the timeline than the MP_BRIDGE_START event, since the current time is modified between them. Dividing the bridge audio segments and modifying the current time at the transition point as described allows there to be a single concept of current time for the audio, animation, and game play. In other embodiments, the current time is modified only after the playback of the bridge audio segment is complete, and at that point it is set to the location of MP_START plus the length of the second sub-segment of the bridge audio segment. As described above, a section that is to be repeated in multi-player mode also can be indicated across multiple MIDI files, in respective tracks called multiplayer_markers, or can be located in the same MIDI track as other MIDI data, spread across multiple MIDI file.

Multi-Player Modes—Game Play

In some embodiments, the input performance can include movement information relating to two or more users. The two or more users can be recognized by the system in a variety of ways. For example, accelerometers or other sensors can be correlated to certain users for use with the system, or in camera based systems, the system can distinguish separate bodies in the image frame. Once each player is identified and correlated with sensor information, then the multiplayer input performance can be evaluated against the target performance. As discussed above, the system can recognize one or more bodies that are present and recorded by the camera. In certain embodiments of multiplayer mode, more than one active skeleton is recognized by the system. Each skeleton can be correlated with a user of the system for purposes of determining an input performance for each user. The input performance can then be evaluated on a per-skeleton basis to determine a score.

The techniques described above can be applied to evaluation of an input performance including more than one skeleton. For example, the active skeletons of the input performance can be normalized and have a number of filters applied to evaluate the performance of the movement relative to the target performance. In some embodiments, the sensor information regarding the movement of multiple simultaneous users can be segmented into separate data for each user. The segmenting divides the received information into multiple separate input data frames that are then each analyzed and evaluated individually. The separate input data frames can be correlated to specific users so the users can be evaluated over time.

Recognition of a Movement from a Set of Possible Movements

The system can support evaluating an input performance against multiple target performances. This can be used to determine what movement is being performed. For example, when the input performance is a dance move, the system can compare the dance move against a group of dance moves to determine which dance move is being performed. The system can do this by comparing the input performance against multiple target performances. When an input performance is received, algorithms in the system can analyze the movement and position information in that input performance. The input performance can be compared against each target performance to perform the analysis.

Each target performance can include one or more filters to measure how a move compares to the target performance. The one or more filters can be associated with a particular move of the target performance, or a particular key frame of the target performance. For example, the one or more filters can be associated with a frame of the target performance or a snapshot of a movement including position and velocity information of the move. Each target performance of the multiple target performances includes its own one or more filters that are used to perform the analysis. A determination can then be made about which move was performed based on matches to the filters of each target performance. The algorithm checks the degree of matching found by each of the filters to determine the closest match between the input performance and each of the multiple target performances. The closest match based on the filters indicates that the input performance correlates to a specific target performance. This recognition information can then be used by the system.

In some embodiments, a set of frames from a target performance is analyzed against the frames of an input performance. This analysis can involve a determination if a threshold is exceeded. The target performance filter set can be implemented using a set of key frames as described above. Each key frame and its accompanying filters can be used to provide a determination about the degree of matching with an input performance of a movement. The key frames and any accompanying filters can be used with the weighting in both position and time. Above, this weighting in position and time were shown using parabolic umbrellas that provided a scoring curve.

In certain embodiments, multilayer processing can be employed. Multilayer processing involves performing a movement recognition using multiple steps or layers of analysis. A decision tree can also be used to minimize the amount of processing that occurs. The decision tree can be implemented by analyzing a movement against a specified set of filters and based on outcomes at each stage determining the movement. For example, at each decision point a number of possible movements can be eliminated based on the result because there was not a match on the specified filter or filters.

A certain amount of preprocessing can be involved in order to increase the accuracy of the match determination using the filters. The preprocessing can include such things as recognizing those moves that can cause misreads. Misreads can occur when one move is confused for being another move, such as when an input performance that the user intended to match against one move is matched by the system against another move. In order to determine whether misreads can occur, algorithms can be developed to test combinations of moves to determine the potential for a misread. These algorithms can include running a target performance movement of a specified dance move against the target performance filters of the other dance moves and analyzing the results. If a target performance movement scores highly against another movement's target performance filters, then a misread may occur. A testing script can be written to record when misreads occur and the movements that are involved. This misread information can then be used to change the target performance filters to lessen the chance of a misread. For example, the filters that are used in the target performance can be weighted differently to focus on differences between the moves.

An algorithm can also be developed to determine the differences between movements and to change filters based on the relative differences between the movements with a potential for a misread amongst one another. For example, a matrix can be created when a misread occurs above a specified threshold, such as when a movement is 65 percent the same as another move. The ranking of the closest movements can then be used to determine the weighting of different filters and the number of filters used in a frame to distinguish between movements. The weights in the filters can be set to increase the accuracy of differentiating between different movements. After changes have been made to the filters of related target performances, the testing script can be run again to determine whether other movements now misread based on the modified filters.

Context information can also be used in order to prevent misreads. For example, certain movements have a high probability of occurring in proximity to one another, while other movements have low probability of occurring in proximity on one another. This context information can be used to along with the target performance information to recognize the movement. In some embodiments, misread information can be used to determine when to display certain movements for performance by one or more users. For example, in a dance game where a user is performing certain dance moves from a set of possible dance moves, those dance moves that may trigger a misread can be placed in different sets to limit the likelihood of a misread during the game.

Information can be correlated with the target performances to allow for retrieval and matching of an input performance against multiple target performances. This information can be metadata associated with the target performance. This metadata can include information from the preprocessing such as likelihood of a misread and can be implemented using fields or tags, for example. The metadata fields can indicate when a move may trigger a misread and can detail which moves may misread against one another. One example of this can be where two moves that might cause a misread are both tagged with an "A" in the misreads field. When moves are then being chosen for the game in a section, those marked with the same tag can trigger the selection of a different move to avoid a misread. In other embodiments, a matrix or a table can be used to store metadata for a movement in a separate place. As movements are being selected for presentation in real time, the algorithm can perform a lookup in the table to determine the metadata and determine how the selection is made to minimize the possibility of a misread.

Figure 6:
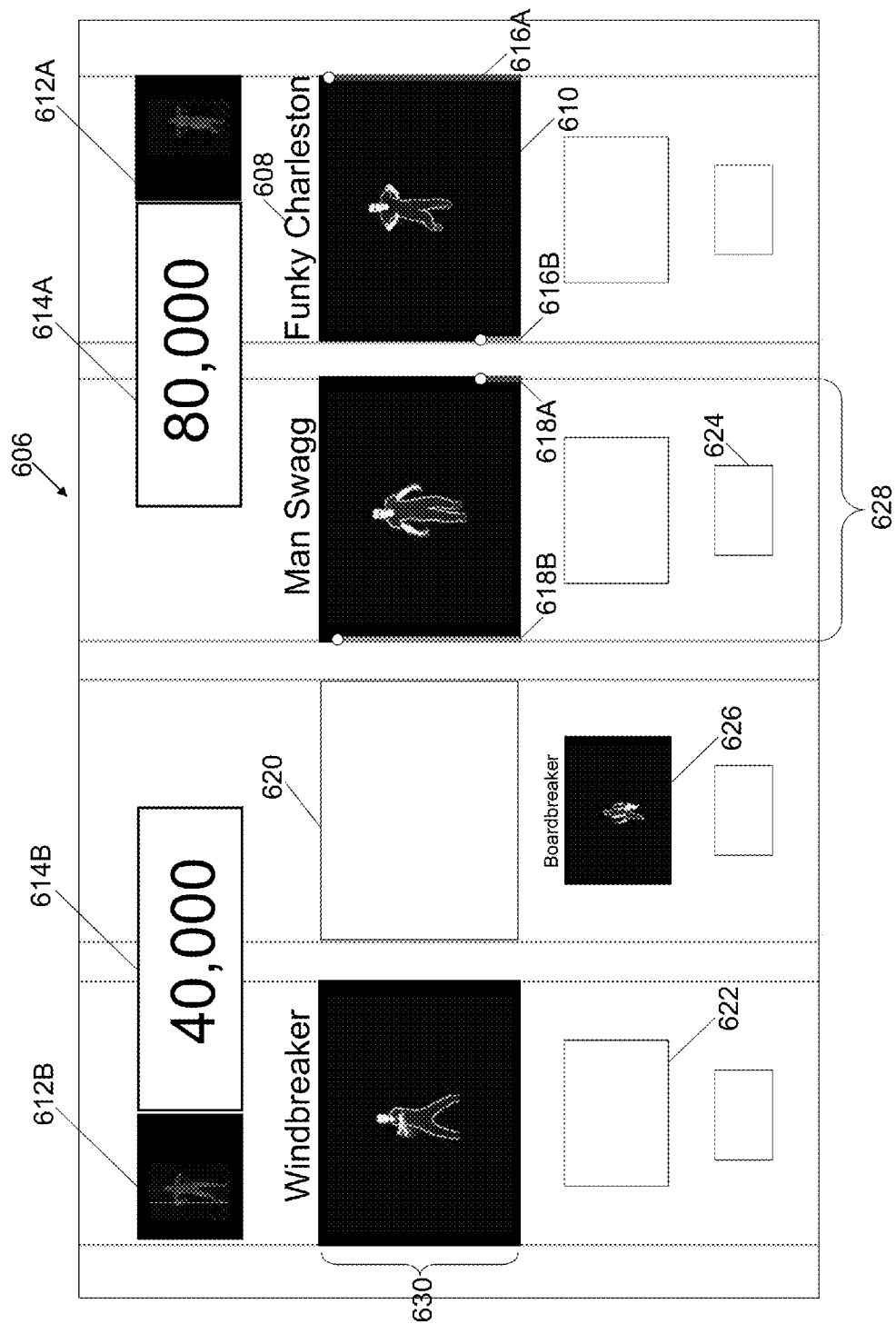
FIG. 6 depicts multiple move recognition in a dance game in accordance with certain embodiments.

FIG. 6 illustrates a recognition of movement amongst a number of target movements in a dance game in accordance with certain embodiments. FIG. 6 includes a display 606, an icon name 608, an icon 610, a representation of the user 612, a score display 614, a dance move match meter 616, a current move position 620, a next move position 622, and a future move position 624. The icon name 608 can be the name of the movement such as a dance move name. An example of a dance move name is the "Funky Charleston." The icon 610 is a graphical representation of the movement to be performed. Icon 610 can show the specific dance move that the user is expected to perform. In order to illustrate the movement, icon 610 can be animated where the animation shows a figure performing the target movement. For example, an outline representation of a man can be used to show what the dance move looks like. The animation can be cycled such that the animation continues repeating the target movement. The animation can be temporally aligned with the audio track in order to cue the user to provide an input performance that is synchronized with the target performance.

The icon 610 can include highlighting or other types of emphasis to assist in illustrating the target dance move. In some embodiments, the icon 610 can be a still picture with emphasis such as arrows and/or highlighting to illustrate the dance move. The icons representing dance moves can travel in a lane 628 on display 606. By travelling in lanes like lane 628, the user can see the upcoming dance moves. The icons can also change while traveling up the lane 628 on the display 606. The types of change the icon may experience include a change in size, a change in appearance, and a change in the animation of the icon. The change in size is demonstrated in FIG. 6 where an icon in the future move position 624 is the smallest, the icon in the current move position 620 space is the largest, and the icon in the next move position 624 is sized between the two. The icon may also change from a still icon to an icon that is animated. For example, when an icon is in position 624 representing a future move and in position 622 representing the next move, the icon can be a still picture such as icon 626. When the icon reaches current move position 620, the icon can change into icon 610 and show the dance move in an animated fashion.

Still icons may include one or more figures and emphasis to represent the movement. As shown in icon 626, arrows are used to indicate the expected movement using a single icon. Icon 626 shows a single FIGURE, but multiple figures along with highlighting and other emphasis can be used. The icons can move through the different positions to signal what are upcoming moves and what moves are currently in play. The moves that are in play 630 are in the current move position 620 and an input performance can be matched against each move that is in the current move position 620. The future dance move position 624 and the next dance move position 622 alert the user to upcoming dance moves so that the user can prepare for when the icon moves to the current move position 620 and the move becomes in play 630.

The representation of the user 612 can illustrate the user's movements back to the user. The representation of the user 612 can show a shadow or outline of the body of the user, an animation representing the user, or the video of the user captured by a camera in the system. The representation of the user 612 aids the user in understanding how the system is sensing the movements made by the user. The feedback provided by the representation of the user 612 allows the user to modify movements to better emulate certain dance moves in some embodiments. In multiplayer mode, two users can play against each other to dance the different moves that are displayed. When the game is in multiplayer mode, the display can be provided with a representation of each user (e.g., 612A and 612B). This allows each user to see what the other user is doing on a single display along with the dance moves.

The score display 614 illustrates an accumulated score for successfully completing different moves. The users score points that are reflected in the score display 614 by successfully completing one of the current dance moves. The different dance moves can provide different amounts of points. In some embodiments, an indication is used to display the relative value of the dance move. The indication can be a modification of icon 610 such that the value can be ascertained visually. The indication can include using different colors to indicate the value of different dance moves. For example, a gold background to the icon 610 indicates the highest point value, while no background can indicate the lowest point value. Other colors, highlighting, or text can be used as an indication to illustrate the worth in points of a particular dance move. In some embodiments, the point value of moves can be randomly assigned such that moves of different point values appear with certain probability.

The dance move match meter 616 provides an indication of how well the input performance matches the target performance. A movement match meter can provide a visual indication of how an input performance compares against multiple target performances. This can include how a movement compares against multiple target movements, for example. The movement match meter indication can represent a variety of different calculations. In some embodiments, the comparison is based on what percentage of filters are matched against an input performance. In other embodiments, the comparison includes a score for each move weighted by temporal and positional error, which is aggregated together into an overall score for the move that is evaluated against the full score for the move. In yet other embodiments, a single filter can be used for a move and this filter provides an analysis of how closely the input performance tracks against the target performance. Looking at FIG. 6, match meters 616A and 618A represent the input performance against both of these dance moves. The user is performing the "Funky Charleston" icon 610 as can be seen in the representation of the user 612A. The match meter 618A provides a match against the "Man Swagg" dance move. Since the user is performing the "Funky Charleston" icon 610, there is little match on the match meter 618A. The match meters 616B and 618B indicate the performance of a second player. In multiplayer mode, users can compete against one other by performing the available current dance moves.

Certain filters, for example, the hip movement, of both dance moves may be similar or the same, so partial matches across multiple dance moves can occur. The match meters also provide feedback to a user so they can understand how well they are performing any one dance move. In some cases, the user may not be performing any of the current dance moves well and the game does not recognize the input performance. The user can then use the match meter and the user representation to understand how closely their performance matches the target performances of the different dance moves. In some embodiments, an array of target performances and match meters can be used to break down different movements for a user to visualize what type of movements they are performing. For example, a sports player can use the system to analyze their movements against the target movements to improve their mechanics.

The multiple movement recognition algorithm can be used to enable a number of different game play elements. FIG. 6 illustrates one type of game play element where each user attempts to dance one move of a group of dance moves. Other game play elements are also possible where performance of the different movements is strategic. This can occur where performance of the moves in a certain pattern is how the game is won. For example, the moves can be arranged in a tic tac toe board configuration and the users dance the moves in order to beat their opponent in the tic tac toe game. In another embodiment, the moves can be separated into columns and each player tries to dance different moves in their column. The multiple movement recognition can also be used as a user interface. This can be useful for setting up a movement sequence for later game play, such as setting up a dance routine. The user can perform a dance move in order to select it for the dance routine. In some embodiments, the user can be prompted to input each dance move and then the dance routine is composed. In other embodiments, the user can perform the routine and the multiple movement recognition can then correlate the movements with the various target performances. The selected dance routine can then be played by the user or shared for play by other users.

In certain embodiments, such as a dance game, timing of movements can be important. For example, when a user is dancing to a song and attempting to perform a dance move, it is generally expected that the dancer should be dancing to the beats of song. It can also be expected that a user needs to setup and transition between dance moves. For a specific dance move in a sequence of dance moves, the final beat or fraction of a beat of the prior move can include movements that include the setup for the dance move. In some embodiments, this pre-move setup can be displayed for a move so that the user can understand the setup for the next dance move and transition between moves. In order to present the moves so the user can dance them in synch with the beats of a song, the dance move can be displayed with this pre-move setup and transition. This display can be offset from the timing of the song.

In order to present a single move so the user can dance it in synch with the beats of a song, the dance move can be displayed based on an offset. The offset enables a move display to begin prior to the beat when the move begins, and to include the beat or fraction of a beat from the prior move in the sequence. This offset provides a cue for a user to set up for the dance move, and keeps the move display and the user in synch with the beats of the song. If the system replays the move display in a loop, the replay can begin before the end of the move, by the same offset. The offset in some embodiments can be a beat or a fraction of beat. A fraction of a beat can be an offset such as three-quarters of beat prior to a downbeat of the song, where the downbeat is when the next dance move would be performed. For example, if a move starts at time t, occupies four beats, and the offset is three-quarters of a beat, the move display may start at time t minus three-quarters of a beat and may include the final three-quarters of a beat from the prior move in the sequence. At time t, the move display begins showing the move. At time t plus three and one-quarter beats, the move display may display what was displayed at t minus three-quarters of a beat, and proceed from there. This provides cues to the user, and keeps the move display synchronized with the beats of the song.

In some embodiments, the movement can be displayed as an animated icon. The animated icon can display the target performance for the user. The collection of target performances can be stored in a variety of ways, such as in an indexed array, as a stream, or with pointers. In each of these ways, information is used to locate the desired target performance data and that data can be used to illustrate the movements of the target performance. For example, if the target performances are stored as a stream, offset information can be used to jump to the correct spot in the stream where the data is stored. In some embodiments, beats and measures can be used to segment the stream into different target performances. The move can be displayed by rendering the target performance into an animation, such as an animation of a figure or person. The position and movement data of the target performance can be used to direct the position and movement of the animation.

In a game where multiple moves are presented to a user, static or dynamic selection can be used to choose the movements for the game play. A static selection mechanism is when the movements are preset and displayed in the order configured. A dynamic selection mechanism can select the moves in real time or automatically. The dynamic selection mechanism can include an algorithm to randomly or otherwise choose movements. For example, in a random selection, the algorithm can limit the group of moves that are available for selection based on metadata or other criteria. In some embodiments, the multiple move recognition can be part of mini-game within a dance game. The dance game can feature linear and non-linear game play, where the linear game play includes a scripted set of dance moves and the non-linear game play includes dancing one of a group of moves. In a dance game including both elements, the moves can be selected from a group of moves that have been already seen by the player. In the dance game, the user can be prompted to perform a series of moves based on a linear arrangement that is segmented by non-linear game play as shown in FIG. 6. The non-linear game play can include moves that were performed during the linear segment of the song.

The dance move selection algorithm can be implemented to select dance moves based on one or more criteria. The criteria can include whether the move was previously performed, whether the move was performed during the prior linear segment of the song, whether the move has been successfully performed by one or multiple users, the possibility of a misread, the value of the move, the difficulty of the move, the length of the move, the caloric value of the move, how the move impacts the position of the user within the field of view of the camera, and how the move impacts the position of the user with respect to the other user. The difficulty of the move can allow for different levels of game play such that a user on an easy setting can get moves that have been identified as easy dance moves. The moves can be different lengths, such as four count moves and eight count moves, where the count refers to the number of beats in length of the move. Further, some dance moves may displace a user making it difficult for a user to perform in non-linear game play. For example, if the move involves a right step and a clap, performing the move multiple times can involve the user moving further and further from their original position. These moves can be pre-identified to avoid difficulty to the user in attempting to perform certain dance moves. Further, some combinations of dance moves may cause one or more users to impinge upon each other's space, and may lead to injury. These combinations can be pre-identified to avoid injury. The dance move selection algorithm can use one or more of these criteria among other information to choose the one or more moves that are displayed together.

The dance move selection algorithm can select the dance moves first and then determine whether the selected dance move meets the criteria or can determine the group of eligible moves and select from that group. When a movement is selected for display, the dance move selection algorithm can locate the movement data and can render the movement data synchronized with the song subject to any offset in timing. This process can be repeated multiple times in order to generate multiple possible dance moves for the user to perform, such as shown in FIG. 6. In some embodiments, the animation can be rendered in three dimensions using information from the x, y, and z axes. In some systems, the display enables three dimensional (3D) display to the user.

In some embodiments, the evaluation computes a degree of matching between each input performance and each target performance of the set of target performances. If the degree of matching for a particular target performance is below a threshold, the system can treat the input performance as if there was no match. The target performance with the highest degree of matching with the input performance can be considered the selected target performance. The system can award a score to the selected target performance. In some embodiments, the system can award a score only to the selected target performance, and not to any of the other target performances.

The system can also handle multiple input performances being evaluated against multiple target performances. The multiple input performances can correlate to input performances by different users. For example, the sensory information can that is received by the system can include multiple input performances. These multiple input performances can be the input performances by the different users. In embodiments with multiple input performances, if the selected target move for one input performance is the same as the selected target move for a different input performance, the input performance with the highest degree of matching is selected as the winning input performance for that move. The system can award a score to the winning input performance. In some embodiments, the system awards a score to the winning input performance, and no other input performance. The system can award scores to each input performance based on the rank of its degree of matching against the target performance.

Additional Variations

The examples given herein of a user satisfying a filter by completing a series of moves can be adapted to satisfy a mirror mode as well. The mirror mode can include where the user provides input that mirrors the target performance, e.g., providing input using a right hand when the target performance uses a left hand, providing right leg input when the target performance uses a left leg, and so forth.

Additionally, where a target performance skeleton is provided, it can be generated beforehand, or can be generated during execution of the game based on the motion capture data.

Any system that can detect movement and capture movement can be used. The sensor information can then be analyzed. Skeletons were discussed as one way of compiling the information, but the motion can be quantified using vectors and position information and filters as described above. For two-dimensional implementations, scoring can be adjusted to compare the projection of the target performance and the projection of the input performance onto a plane parallel to the screen. Although the system and technology has been described in terms of a camera input system like Kinect, camera systems that utilizes sensors on the user's body, e.g., PLAYSTATION® Move, or systems that use sensors held in the user's hand, e.g., the NINTENDO® Wii, may also be utilized. In those implementations where only hand held sensors are utilized by the user, testing for leg input may be ignored or not performed.

Although the embodiments described herein use dancing as an example, and the performance is typically accompanied by a song, the performance can also be movements that occur on a timeline with no musical accompaniment, e.g., a series of yoga poses, movements in a martial arts kata, or the like.

In some implementations, the mocap data is mapped to a skeleton similar to that used to reflect the user's input. Thus, the mocap data is used to generate an ideal skeleton that represents a performance of the dance routine in a format that is directly comparable to the skeleton representing the user's input. Then, during the game, as the user provides input, the user's skeleton is compared to the ideal skeleton, in effect normalizing the target input (the target performance) and actual inputs (the user's performance) to the same frame of reference, i.e., both performances are expressed in terms of the same skeleton-based technology.

In some embodiments, rather than matching position necessarily within a time window as described above, filter types are predefined and used to test user input. For example, proximity filters tests if a joint in a particular position, or close to a particular other joint, e.g., are the left wrist and right wrist less than, greater than, or within a delta of a certain distance of one another. Another filter is a displacement filter which tests if a joint has moved a certain distance between times to and $t_n$. Another example is the angle filter, which tests if a joint is at a particular angle from the origin. One or more of these filters is then inserted into the timeline and bound to joints such that at a particular time, the condition is tested, e.g., "has the RIGHT WRIST moved from $x_0$ to $x_n$ since I began tracking it?" would be a displacement filter. If the user's wrist had, then the filter would be satisfied. Yet another filter is an acceleration filter which tests if a joint or bone has accelerated or decelerated between times to and $t_n$. An acceleration filter can also test whether the magnitude of the acceleration matches a predetermined value.

In these embodiments, multiple filters can be overlaid on the timeline, and tested, in effect, simultaneously. An overall score for the frame is determined based on contributions from all of the active filters during a given frame. The filters can output a Boolean, and the score is computed from those. Or—in some implementations—the outputs are continuous, and the aggregate score is computed from those. Similar to the system described above, contributions from each active filter can be weighted differently in their contributions to the score. For Boolean filters, successfully completing three out of five filters gives the user a score of 0.6. In some implementations, each key frame comparison gives a percentage credit for the move as a whole being correct. The user's score may be adjusted based on the aggregate score for a key frame. Alternatively, the aggregate score for a key frame may be quantized into groups, each group being compared to one or more thresholds, each group associated with a score that is added to the user's score. In any of these, if the user achieves a threshold score for a move, where if the user meets or exceeds the threshold, e.g., 80 percent, the user is considered to have successfully performed the move.

In some embodiments, execution of game software limits the game platform 120 to a particular purpose, e.g., playing the particular game. In these scenarios, the game platform 120 combined with the software, in effect, becomes a particular machine while the software is executing. In some embodiments, though other tasks may be performed while the software is running, execution of the software still limits the game platform 120 and may negatively impact performance of the other tasks. While the game software is executing, the game platform directs output related to the execution of the game software to a display, thereby controlling the operation of the display. The game platform 120 also can receive inputs provided by one or more users, perform operations and calculations on those inputs, and direct the display to depict a representation of the inputs received and other data such as results from the operations and calculations, thereby transforming the input received from the users into a visual representation of the input and/or the visual representation of an effect caused by the user.

The above-described techniques can be implemented in digital electronic circuitry, or in computer hardware, firmware, software, or in combinations of them. The implementation can be as a computer program product, i.e., a computer program tangibly embodied in a non-transient machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as, a game platform such as a dedicated game console, e.g., PLAYSTA- TION® 2, PLAYSTATION® 3, or PSP® manufactured by Sony Corporation; NINTENDO WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer or game console also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include a camera-based system as described herein, simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, or auditory feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the filters and multiple movement recognition can be used to analyze a golf swing.

We claim:

1. A method executed on a game console comprising:
   instructing a display to display a set of dance moves that are available for performance during a song in a dance game, wherein the set of dance moves is related to a target performance that comprises a plurality of frames, each frame being associated with a target performance skeleton that is normalized by deriving one or more target unit vectors, each of which reflects a target position of one interest point of the target performance skeleton relative to another interest point of the target performance skeleton,
   wherein a subset of the plurality of frames comprises at least one key frame, and
   wherein the target performance skeleton is represented, at least in part by, the one or more target unit vectors;
   receiving, at the dance game executing on the game console, an input performance by a player of the dance game, wherein the input performance is indicative of a performance of the player, and wherein the input performance comprises an input performance skeleton having a first interest point and a second interest point;
   normalizing, at the dance game executing on the game console, the input performance skeleton of the input performance by deriving an input unit vector reflecting an input position of the first interest point of the input performance skeleton relative to the second interest point of the input performance skeleton, wherein the input performance skeleton is represented, at least in part by, the input unit vector; and
   determining a degree of matching between the input performance and the at least one key frame of the target performance based, in part, on a similarity of the normalized target performance skeleton and the normalized input performance skeleton.

2. The method of claim 1, wherein:
   the input performance comprises a plurality of frames, each frame being associated with an input performance skeleton,
   each input performance skeleton is normalized by deriving an input unit vector reflecting an input position of a first interest point of the corresponding input performance skeleton relative to a second interest point of the corresponding input performance skeleton, and
   the degree of matching is determined to be zero when none of the frames of the input performance within a predetermined time window matches the at least one key frame.

3. The method of claim 1, wherein the at least one key frame provides differing weights to different aspects of the position and movement information of the target performance in determining the degree of matching.

4. The method of claim 1, further comprising:
assigning a score based on the degree of matching between the input performance and each of a plurality of target performances; and
recognizing a match between the input performance and one of the plurality of target performances when the score exceeds a predetermined dance move performance threshold.

5. The method of claim 1, further comprising:
instructing the display to display a plurality of target performances as icons that are animated; and
offsetting a beginning of the animation relative to beats of the song.

6. The method of claim 1, further comprising:
receiving sensory information that includes a plurality of input performances; and
evaluating the plurality of input performances against a plurality of target performances to determine matches between the plurality of input performances and each of the plurality of target performances.

7. The method of claim 1, further comprising:
selecting a target performance based on the degree of matching between the input performance and each of a plurality of target performances, wherein a higher degree of matching indicates a closer match; and
adding the selected target performance to a dance routine that is being created.

8. The method of claim 1, wherein normalizing the input performance skeleton comprises determining a vector associated with an input position of a joint relative to a reference joint in the input performance skeleton.

9. The method of claim 1, wherein normalizing the input performance skeleton comprises normalizing a first joint relative to a first reference joint in the input performance skeleton and normalizing a second joint relative to a second reference joint in the input performance skeleton.

10. The method of claim 3, wherein the weights correspond to different bone groups of the target performance skeleton to emphasize a particular motion in determining the degree of matching.

11. The method of claim 1, wherein the at least one key frame provides differing weights to different dimensions of movements associated with the input performance in determining the degree of matching.

12. The method of claim 1, wherein the at least one key frame comprises a time offset relative to a beginning of the target performance.

13. The method of claim 1, wherein determining the degree of matching between the input performance and the at least one key frame of the target performance comprises determining the degree of matching between the input performance and the at least one key frame of the target performance based solely on the similarity of the at least one key frame and frames of the normalized input performance within a predetermined time window.

14. A non-transitory computer readable medium that comprises computer readable instructions that when executed perform steps comprising:
instruct a display to display a set of dance moves that are available for performance during a song in a dance game, wherein the set of dance moves is related to a target performance that comprises a plurality of frames, each frame being associated with a target performance skeleton that is normalized by deriving one or more target unit vectors, each of which reflects a target position of one interest point of the target performance skeleton relative to another interest point of the target performance skeleton,
wherein a subset of the plurality of frames comprises at least one key frame, and
wherein the target performance skeleton is represented, at least in part by, the one or more target unit vectors;
receive an input performance from a player of the dance game, wherein the input performance is indicative of a performance of the player, and wherein the input performance comprises an input performance skeleton having a first interest point and a second interest point;
normalize the input performance skeleton of the input performance by deriving an input unit vector reflecting an input position of the first interest point of the input performance skeleton relative to the second interest point of the input performance skeleton, wherein the input performance skeleton is represented, at least in part by, the input unit vector; and
determine a degree of matching between the input performance and the at least one key frame of the target performance based, in part, on a similarity of the normalized target performance skeleton and the normalized input performance skeleton.

15. The computer readable medium of claim 14, wherein:
the input performance comprises a plurality of frames, each frame being associated with an input performance skeleton,
each input performance skeleton is normalized by deriving an input unit vector reflecting an input position of a first interest point of the corresponding input performance skeleton relative to a second interest point of the corresponding input performance skeleton, and
the degree of matching is determined to be zero when none of the frames of the input performance within a predetermined time window matches the at least one key frame.

16. The computer readable medium of claim 14, wherein the at least one key frame provides differing weights to different aspects of the position and movement information of the target performance in determining the degree of matching.

17. The computer readable medium of claim 14, further comprising computer readable instructions that, when executed, perform steps of:
assigning a score based on the degree of matching between the input performance and each of a plurality of target performances; and
recognizing a match between the input performance and one of the plurality of target performances when the score exceeds a predetermined dance move performance threshold.

18. The computer readable medium of claim 14, further comprising computer readable instructions that, when executed, perform steps of:
receiving sensory information that includes a plurality of input performances; and
evaluating the plurality of input performances against a plurality of target performances to determine matches between the plurality of input performances and each of the plurality of target performances.

19. The non-transitory computer readable medium of claim 14, wherein the at least one key frame provides differing weights to different dimensions of movements associated with the input performance in determining the degree of matching.

20. The non-transitory computer readable medium of claim 14, wherein the at least one key frame comprises a time offset relative to a beginning of the target performance.

21. A game platform system configured to receive movement sensor information including an input performance by a player of a dance game, wherein the input performance is indicative of a performance of the player, wherein the input performance comprises an input performance skeleton having a first interest point and a second interest point, and the game platform system includes a processor configured to read instructions from memory to:

instruct a display to display a set of dance moves that are available for performance during a song in the dance game, wherein the set of dance moves is related to a target performance that comprises a plurality of frames, each frame being associated with a target performance skeleton that is normalized by deriving one or more target unit vectors, each of which reflects a target position of one interest point of the target performance skeleton relative to another interest point of the target performance skeleton, wherein a subset of the plurality of frames comprises at least one key frame, and wherein the target performance skeleton is represented, at least in part by, the one or more target unit vectors;

normalize the input performance skeleton of the input performance by deriving an input unit vector reflecting an input position of the first interest point of the input performance skeleton relative to the second interest point of the input performance skeleton, wherein the input performance skeleton is represented, at least in part by, the input unit vector; and determine a degree of matching between the input performance and the at least one key frame of the target performance based, in part, on a similarity of the normalized target performance skeleton and the normalized input performance skeleton.

22. The game platform of claim 21, wherein:

the input performance comprises a plurality of frames, each frame being associated with an input performance skeleton, each input performance skeleton is normalized by deriving an input unit vector reflecting an input position of a first interest point of the corresponding input performance skeleton relative to a second interest point of the corresponding input performance skeleton, and the degree of matching is determined to be zero when none of the frames of the input performance within a predetermined time window matches the at least one key frame.

23. The game platform system of claim 21, wherein the at least one key frame provides differing weights to different dimensions of movements associated with the input performance in determining the degree of matching.

24. The game platform system of claim 21, wherein the at least one key frame comprises a time offset relative to a beginning of the target performance.

* * * * *